(12) United States Patent
Worrall

(10) Patent No.: US 10,743,284 B2
(45) Date of Patent: *Aug. 11, 2020

(54) PAGING IN A WIRELESS NETWORK

(71) Applicant: INTELLECTUAL VENTURES II LLC, Wilmington, DE (US)

(72) Inventor: Chandrika K. Worrall, Newbury (GB)

(73) Assignee: Intellectual Ventures II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,629

(22) Filed: Apr. 9, 2018

(65) Prior Publication Data

US 2018/0359723 A1 Dec. 13, 2018

Related U.S. Application Data

(63) Continuation of application No. 15/385,120, filed on Dec. 20, 2016, now Pat. No. 9,942,875, which is a
(Continued)

(51) Int. Cl.
*H04W 28/04* (2009.01)
*H04W 60/04* (2009.01)
*H04W 68/02* (2009.01)
*H04W 68/00* (2009.01)
*H04W 72/04* (2009.01)
(Continued)

(52) U.S. Cl.
CPC .......... *H04W 68/02* (2013.01); *H04W 68/00* (2013.01); *H04W 72/0406* (2013.01); *H04W 74/0833* (2013.01); *H04L 1/1607* (2013.01); *H04W 8/26* (2013.01); *H04W 76/10* (2018.02); *H04W 84/042* (2013.01); *H04W 92/10* (2013.01)

(58) Field of Classification Search
None
See application file for complete search history.

(56) References Cited

U.S. PATENT DOCUMENTS 6,091,781 A 7/2000 Mujtaba
6,137,785 A 10/2000 Bar-Ness
(Continued)

FOREIGN PATENT DOCUMENTS

EP 0544462 A2 6/1993
EP 1465444 A2 10/2004
(Continued)

OTHER PUBLICATIONS

Petition for Inter Partes Review, filed in *T-Mobile USA, Inc., et al. v. Intellectual Ventures II LLC*, Case No. IPR2018-01775 (P.T.A.B), Paper 1, filed Sep. 21, 2018; 78 pages.
(Continued)

*Primary Examiner* — Ajit Patel
(74) *Attorney, Agent, or Firm* — Sterne, Kessler, Goldstein & Fox P.L.L.C.

(57) ABSTRACT

A network device may produce, in response to a paging message for a user equipment (UE), a first message derived from a paging identification and control information. The control information may include an indication of shared channel resources. The network device may transmit the first message on a control channel and a second message on a shared channel having the indicated shared channel resources.

12 Claims, 8 Drawing Sheets

Related U.S. Application Data continuation of application No. 14/222,140, filed on Mar. 21, 2014, now Pat. No. 9,532,330, which is a continuation of application No. 11/416,865, filed on May 2, 2006, now Pat. No. 8,682,357.

(51) Int. Cl.
<table>
<tr><td>H04W 74/08</td><td>(2009.01)</td></tr>
<tr><td>H04W 76/10</td><td>(2018.01)</td></tr>
<tr><td>H04L 1/16</td><td>(2006.01)</td></tr>
<tr><td>H04W 8/26</td><td>(2009.01)</td></tr>
<tr><td>H04W 84/04</td><td>(2009.01)</td></tr>
<tr><td>H04W 92/10</td><td>(2009.01)</td></tr>
</table>

(56) References Cited

U.S. PATENT DOCUMENTS

<table>
<tr><td>6,289,203 B1</td><td>9/2001</td><td>Smith et al.</td></tr>
<tr><td>6,876,636 B2</td><td>4/2005</td><td>Sinnarajah et al.</td></tr>
<tr><td>6,898,429 B1*</td><td>5/2005</td><td>Vialen .................. H04W 68/00<br>455/432.1</td></tr>
<tr><td>7,471,957 B2*</td><td>12/2008</td><td>Palkisto ................ H04W 68/12<br>370/328</td></tr>
<tr><td>7,738,448 B2</td><td>6/2010</td><td>Renschler</td></tr>
<tr><td>7,912,471 B2</td><td>3/2011</td><td>Kodikara Patabandi et al.</td></tr>
<tr><td>8,107,962 B2</td><td>1/2012</td><td>Parmar et al.</td></tr>
<tr><td>8,135,420 B2</td><td>3/2012</td><td>Lee et al.</td></tr>
<tr><td>8,682,357 B2</td><td>3/2014</td><td>Worrall</td></tr>
<tr><td>8,914,048 B2</td><td>12/2014</td><td>Montojo et al.</td></tr>
<tr><td>9,532,330 B2</td><td>12/2016</td><td>Worrall</td></tr>
<tr><td>9,942,875 B2</td><td>4/2018</td><td>Worrall</td></tr>
<tr><td>2001/0036810 A1</td><td>11/2001</td><td>Larsen</td></tr>
<tr><td>2003/0123382 A1</td><td>7/2003</td><td>Wang et al.</td></tr>
<tr><td>2004/0008679 A1</td><td>1/2004</td><td>Sinnarajah et al.</td></tr>
<tr><td>2004/0023672 A1</td><td>2/2004</td><td>Terry</td></tr>
<tr><td>2004/0142706 A1</td><td>7/2004</td><td>Kim et al.</td></tr>
<tr><td>2004/0229626 A1</td><td>11/2004</td><td>Yi et al.</td></tr>
<tr><td>2004/0266440 A1</td><td>12/2004</td><td>Fuchs et al.</td></tr>
<tr><td>2005/0041610 A1</td><td>2/2005</td><td>Lee et al.</td></tr>
<tr><td>2005/0105487 A1</td><td>5/2005</td><td>Rudolf et al.</td></tr>
<tr><td>2005/0233732 A1*</td><td>10/2005</td><td>Kwak .................... H04H 60/91<br>455/414.1</td></tr>
<tr><td>2005/0266846 A1</td><td>12/2005</td><td>Kim</td></tr>
<tr><td>2006/0019641 A1</td><td>1/2006</td><td>Vayanos et al.</td></tr>
<tr><td>2007/0218901 A1</td><td>9/2007</td><td>Tenny</td></tr>
<tr><td>2007/0259675 A1</td><td>11/2007</td><td>Worrall</td></tr>
<tr><td>2014/0206370 A1</td><td>7/2014</td><td>Worrall</td></tr>
<tr><td>2017/0164326 A1</td><td>6/2017</td><td>Worrall</td></tr>
</table>

FOREIGN PATENT DOCUMENTS

<table>
<tr><td>EP</td><td>1631013 A1</td><td>3/2006</td></tr>
<tr><td>EP</td><td>1631016 A1</td><td>3/2006</td></tr>
<tr><td>JP</td><td>5055610 A2</td><td>3/1993</td></tr>
<tr><td>JP</td><td>2009522889 T2</td><td>6/2009</td></tr>
<tr><td>JP</td><td>2009522893 T2</td><td>6/2009</td></tr>
<tr><td>WO</td><td>WO 2004/036947 A1</td><td>4/2004</td></tr>
<tr><td>WO</td><td>WO 2004/056145 A2</td><td>7/2004</td></tr>
<tr><td>WO</td><td>WO 2004/057896 A1</td><td>7/2004</td></tr>
<tr><td>WO</td><td>WO 2007/059791 A1</td><td>5/2007</td></tr>
</table>

OTHER PUBLICATIONS

Declaration of Dr. Martin G. Walker, filed in *T-Mobile USA, Inc., et al. v. Intellectual Ventures II LLC*, Case No. IPR2018-01775 (P.T.A.B), Exhibit 1002, filed Sep. 21; 71 pages.
Curriculum Vitae of Dr. Martin G. Walker, filed in *T-Mobile USA, Inc., et al. v. Intellectual Ventures II LLC*, Case No. IPR2018-01775 (P.T.A.B), Exhibit 1003, filed Sep. 21, 2018; 27 pages.
Prosecution File History of U.S. Appl. No. 11/416,865, filed in *T-Mobile USA, Inc., et al. v. Intellectual Ventures II LLC*, Case No. IPR2018-01775 (P.T.A.B), Exhibit 1004, filed Sep. 21, 2018; 587 pages.

3rd Generation Partnership Project; Technical Specification Group Services and System Aspects; Multimedia Broadcast/Multicast Service (MBMS); Architecture and functional description (Release 6) v6.9.0 (Dec. 2005), filed in *T-Mobile USA, Inc., et al. v. Intellectual Ventures II LLC*, Case No. IPR2018-01775 (P.T.A.B), Exhibit 1005, filed Sep. 21, 2018; 47 pages.
3rd Generation Partnership Project TR 25.813; Technical Specification Group Radio Access Network; Evolved Universal Terrestrial Radio Access (E-UTRA) and Evolved Universal Terrestrial Radio Access Network (E-UTRAN); Radio interface protocol aspects (Release 7) v0.8.1 (Apr. 2006), filed in *T-Mobile USA, Inc., et al. v. Intellectual Ventures II LLC*, Case No. IPR2018-01775 (P.T.A.B), Exhibit 1006 (appears incorrect document was filed by petitioner), filed Sep. 21, 2018; 26 pages.
3rd Generation Partnership Project TS 25.304; Technical Specification Group Radio Access Network; Evolved Universal Terrestrial Radio Access Network; User Equipment (UE) procedures in idle mode and procedures for cell reselection in connected mode (Release 7) v7.0.0 (Mar. 2006), filed in *T-Mobile USA, Inc., et al. v. Intellectual Ventures II LLC*, Case No. IPR2018-01775 (P.T.A.B), Exhibit 1007 (appears incorrect document was filed by petitioner), filed Sep. 21, 2018; 38 pages.
3GPP TS 25.211; Technical Specification Group Radio Access Network; Physical channels and mapping of transport channels onto physical channels (FDD) (Release 7) v7.0.0 (Mar. 2006), filed in *T-Mobile USA, Inc., et al. v. Intellectual Ventures II LLC*, Case No. IPR2018-01775 (P.T.A.B), Exhibit 1008, filed Sep. 21, 2018; 51 pages.
U.S. Appl. No. 60/795,675, filed in *T-Mobile USA, Inc., et al. v. Intellectual Ventures II LLC*, Case No. IPR2018-01775 (P.T.A.B), Exhibit 1010, filed Sep. 21, 2018; 24 pages.
U.S. Appl. No. 60/757,063, filed in *T-Mobile USA, Inc., et al. v. Intellectual Ventures II LLC*, Case No. IPR2018-01775 (P.T.A.B), Exhibit 1012, filed Sep. 21, 2018; 75 pages.
U.S. Appl. No. 60/783,250, filed in *T-Mobile USA, Inc., et al. v. Intellectual Ventures II LLC*, Case No. IPR2018-01775 (P.T.A.B), Exhibit 1013, filed Sep. 21, 2018; 179 pages.
U.S. Appl. No. 60/784,680, filed in *T-Mobile USA, Inc., et al. v. Intellectual Ventures II LLC*, Case No. IPR2018-01775 (P.T.A.B), Exhibit 1014, filed Sep. 21, 2018; 22 pages.
Philips, "Evolved Paging for LTE," published Feb. 13, 2006, prior to 3GPP TSG-RAN WG2 Meeting #51, Denver, USA, Feb. 13-17, 2006, filed in *T-Mobile USA, Inc., et al. v. Intellectual Ventures II LLC*, Case No. IPR2018-01775 (P.T.A.B), Exhibit 1015, filed Sep. 21, 2018; 4 pages.
Sharp, R1-061136, "UE Identity in L1/L2 Downlink Control Signalling," Apr. 28, 2006, filed in *T-Mobile USA, Inc., et al. v. Intellectual Ventures II LLC*, Case No. IPR2018-01775 (P.T.A.B), Exhibit 1016, filed Sep. 21, 2018; 7 pages.
Nokia, et al., "E-UTRA Transport Channels," published prior to 3GPP TSG-RAN WG2 Meeting #48bis, Cannes, France, Oct. 10-14, 2005, R2-052438, filed in *T-Mobile USA, Inc., et al. v. Intellectual Ventures II LLC*, Case No. IPR2018-01775 (P.T.A.B), Exhibit 1017, filed Sep. 21, 2018; 3 pages.
Ericsson, "Paging for E-UTRA," 3GPP TSG-RAN WG1 LTE AdHoc Meeting, Helsinki, Finland, Jan. 23-25, 2006, R1-060092, filed in *T-Mobile USA, Inc., et al. v. Intellectual Ventures II LLC*, Case No. IPR2018-01775 (P.T.A.B), Exhibit 1018, filed Sep. 21, 2018; 1 page.
Selected Pages from Patent Owner's infringement contentions in the related litigation *Intellectual Ventures II LLC v. T-Mobile USA, INC. et al.*, No. 2:17-cv-00662 (E.D. Tex. 2017); consolidated with *Intellectual Ventures II LLC v. Sprint, et al.*, No. 2:17-cv-00661 (E.D. Tex. 2017), filed in *T-Mobile USA, Inc., et al. v. Intellectual Ventures II LLC*, Case No. IPR2018-01775 (P.T.A.B), Exhibit 1019, filed Sep. 21, 2018; 3 pages.
Petition for Inter Partes Review, filed in *Ericsson Inc., v. Intellectual Ventures II LLC*, Case. No. IPR2018-01380 (P.T.A.B), Paper 2, filed Jul. 11, 2018; 78 pages.
Prosecution File History of U.S. Appl. No. 11/416,865, filed in *Ericsson Inc. v. Intellectual Ventures II LLC*, Case No. IPR2018-01380 (P.T.A.B), Exhibit 1002, filed Jul. 11, 2018; 583 pages.

(56) References Cited

OTHER PUBLICATIONS

Declaration of Dr. Vijay K. Madisetti, filed in *Ericsson Inc. v. Intellectual Ventures II LLC*, Case No. IPR2018-01380 (P.T.A.B), Exhibit 1003, filed Jul. 11, 2018; 96 pages.
Curriculum Vitae of Dr. Vijay K. Madisetti, filed in *Ericsson Inc. v. Intellectual Ventures II LLC*, Case No. IPR2018-01380 (P.T.A.B), Exhibit 1004, filed Jul. 11, 2018; 29 pages.
Catt, "PCH mapping and Paging Control," published Mar. 24, 2006, prior to 3GPP RAN1/RAN2 joint meeting on LTE, Athens, Greece, Mar. 27-31, 2006, R2-060988, filed in *Ericsson Inc. v. Intellectual Ventures II LLC*, Case No. IPR2018-01380 (P.T.A.B), Exhibit 1005, filed Jul. 11, 2018; 5 pages.
LG Electronics, "Discussion on LTE Paging and DRX," published Mar. 23, 2006, prior to Joint RAN WG1 and RAN WG2 on LTE, Athens, Greece, Mar. 27-31, 2006, R2-061014, filed in *Ericsson Inc. v. Intellectual Ventures II LLC*, Case No. IPR2018-01380 (P.T.A.B), Exhibit 1006, filed Jul. 11, 2018; 2 pages.
Catt and Ritt, "Access Procedure for TDD," published Mar. 23, 2006, prior to 3GPP RAN1/RAN2 joint meeting on LTE, Athens, Greece, Mar. 27-31, 2006, R2-060905, filed in *Ericsson Inc. v. Intellectual Ventures II LLC*, Case No. IPR2018-01380 (P.T.A.B), Exhibit 1007, filed Jul. 11, 2018; 4 pages.
Huawei, "Inter-cell Interference Mitigation," 3GPP TSG RAN WG1 Ad Hoc on LTE, Sophia Antipolis, France, Jun. 20-21, 2005, R1-050629, filed in *Ericsson Inc. v. Intellectual Ventures II LLC*, Case No. IPR2018-01380 (P.T.A.B), Exhibit 1008, filed Jul. 11, 2018; 3 pages.
Holma, Harri & Antti Toskala, WCDMA for UMTS: Radio Access for Third Generation Mobile Communications, Rev. ed. (2001), filed in *Ericsson Inc. v. Intellectual Ventures II LLC*, Case No. IPR2018-01380 (P.T.A.B), Exhibit 1010, filed Jul. 11, 2018; 120 pages.
Richardson, Andrew, WCDMA Design Handbook (2005), filed in *Ericsson Inc. v. Intellectual Ventures II LLC*, Case No. IPR2018-01380 (P.T.A.B), Exhibit 1011, filed Jul. 11, 2018; 68 pages.
Rappaport, Theodore S., Wireless Communications, Principles & Practices, 1st ed., (1996), filed in *Ericsson Inc. v. Intellectual Ventures II LLC*, Case No. IPR2018-01380 (P.T.A.B), Exhibit 1012, filed Jul. 11, 2018; 35 pages.
3GPP Technical Report, Technical Specification Group Radio Access Network, Evolved Universal Terrestrial Radio Access (EUTRA) and Evolved Universal Terrestrial Radio Access Network (E-UTRAN), Radio Interface Protocol Aspects (Release 7), TR 25.813, v.0.6.0 (Mar. 2006), filed in *Ericsson Inc. v. Intellectual Ventures II LLC*, Case No. IPR2018-01380 (P.T.A.B), Exhibit 1013, filed Jul. 11, 2018; 30 pages.
Ekström, Hannes et al., "Technical Solutions for the 3G Long-Term Evolution," IEEE Communications Magazine, Mar. 2006, pp. 38-45, filed in *Ericsson Inc. v. Intellectual Ventures II LLC*, Case No. IPR2018-01380 (P.T.A.B), Exhibit 1014, filed Jul. 11, 2018; 8 pages.
Declaration of Craig Bishop, filed in *Ericsson Inc. v. Intellectual Ventures II LLC*, Case No. IPR2018-01380 (P.T.A.B), Exhibit 1015, filed Jul. 11, 2018; 263 pages.
Declaration of Sven Ekemark, filed in *Ericsson Inc. v. Intellectual Ventures II LLC*, Case No. IPR2018-01380 (P.T.A.B), Exhibit 1016, filed Jul. 11, 2018; 187 pages.
Newton, Harry, Newton's Telecom Dictionary, 14th Ed. (1998) (selected pages), filed in *Ericsson Inc. v. Intellectual Ventures II LLC*, Case No. IPR2018-01380 (P.T.A.B), Exhibit 1017, filed Jul. 11, 2018; 4 pages.
3GPP Technical Report, Technical Specification Group Radio Access Network, Evolved Universal Terrestrial Radio Access (EUTRA) and Evolved Universal Terrestrial Radio Access Network (E-UTRAN), Radio Interface Protocol Aspects (Release 7), TR 25.813, v.0.6.0 (Mar. 2006) (same as Ex. 1013 but accepting all changes shown in document as track changes; references to the document are to Ex. 1013), filed in *Ericsson Inc. v. Intellectual Ventures II LLC*, Case No. IPR2018-01380 (P.T.A.B), Exhibit 1018, filed Jul. 11, 2018; 26 pages.

IEEE XPlore Abstract page for Ekström, found at https://ieeexplore.ieee.org/document/1607864/, filed in *Ericsson Inc. v. Intellectual Ventures II LLC*, Case No. IPR2018-01380 (P.T.A.B), Exhibit 1019, filed Jul. 11, 2018; 2 pages.
Complaint [1], filed in *Intellectual Ventures II LLC v. T-Mobile USA, Inc. f/k/a MetroPCS Communications, Inc. et al*, Case No. TXED-2-17-cv-00661, filed Sep. 21, 2017; 43 pages.
The T-Mobile and Sprint Defendants' Motion to Dismiss [20], filed in *Intellectual Ventures II LLC v. T-Mobile USA, Inc. f/k/a MetroPCS Communications, Inc. et al*, Case No. TXED-2-17-cv-00661, filed Dec. 7, 2017; 36 pages.
Ericsson's Motion to Dismiss [22], filed in *Intellectual Ventures II LLC v. T-Mobile USA, Inc. f/k/a MetroPCS Communications, Inc. et al*, Case No. TXED-2-17-cv-00661, filed Dec. 7, 2017; 15 pages.
Defendants' T-Mobile UAS, Inc. and T-Mobile US, Inc. Notice of Joinder [27], filed in *Intellectual Ventures II LLC v. T-Mobile USA, Inc. f/k/a MetroPCS Communications, Inc. et al*, Case No. TXED-2-17-cv-00661, filed Dec. 7, 2017; 2 pages.
Nokia of America Corporation's Answer and Affirmative Defenses [Null], filed in *Intellectual Ventures II LLC v. T-Mobile USA, Inc. f/k/a MetroPCS Communications, Inc. et al*, Case No. TXED-2-17-cv-00661, filed Apr. 12, 2018; 57 pages.
Order Denying Defendants' Motion to Dismiss [60], filed in *Intellectual Ventures II LLC v. T-Mobile USA, Inc. f/k/a MetroPCS Communications, Inc. et al*, Case No. TXED-2-17-cv-00661, filed Sep. 18, 2018; 8 pages.
Order and Opinion on Deffendants' Motions to Dismiss [62], filed in *Intellectual Ventures II LLC v. T-Mobile USA, Inc. f/k/a MetroPCS Communications, Inc. et al*, Case No. TXED-2-17-cv-00661, filed Sep. 24, 2018; 19 pages.
Complaint [1], filed by Intellectual Ventures II, LLC, filed in *Intellectual Ventures II LLC v. Sprint Spectrum LP d/b/a Sprint PCS et al.*, Case No. TXED-2-17-cv-00662, filed Sep. 21, 2017; 44 pages.
T-Mobile and Sprint Defendants' Motion to Dismiss [26], filed in *Intellectual Ventures II LLC v. Sprint Spectrum LP d/b/a Sprint PCS et al.*, Case No. TXED-2-17-cv-00662, filed Dec. 7, 2017; 36 pages.
Ericsson's Motion to Dismiss [28], filed in *Intellectual Ventures II LLC v. Sprint Spectrum LP d/b/a Sprint PCS et al.*, Case No. TXED-2-17-cv-00662, filed Dec. 7, 2017; 15 pages.
Defendant Alcatel-Lucent USA, Inc.'s Answer and Affirmative Defense [33], filed by Intellectual Ventures II, LLC, filed in *Intellectual Ventures II LLC v. Sprint Spectrum LP d/b/a Sprint PCS et al.*, Case No. TXED-2-17-cv-00662, filed Dec. 7, 2017; 58 pages.
Intellectual Ventures II LLC's Answer to Alcatel-Lucent USA, Inc.'s Counterclaims [54], filed in *Intellectual Ventures II LLC v. Sprint Spectrum LP d/b/a Sprint PCS et al.*, Case No. TXED-2-17-cv-00662, filed Dec. 29, 2017; 7 pages.
Order [115], filed in *Intellectual Ventures II LLC v. Sprint Spectrum LP d/b/a Sprint PCS et al.*, Case No. TXED-2-17-cv-00662, filed Apr. 2, 2018; 1 pages.
Nokia of America Corporation's Answer and Affirmative Defense [118], filed in *Intellectual Ventures II LLC v. Sprint Spectrum LP d/b/a Sprint PCS et al.*, Case No. TXED-2-17-cv-00662, filed Apr. 12, 2018; 57 pages.
Plaintiff Intellectual Ventures II LLC's Answer to Nokia of America [120], filed in *Intellectual Ventures II LLC v. Sprint Spectrum LP d/b/a Sprint PCS et al.*, Case No. TXED-2-17-cv-00662, filed Apr. 12, 2018; 7 pages.
Plaintiff Intellectual Ventures' Opening Supplemental Brief [126], filed in *Intellectual Ventures II LLC v. Sprint Spectrum LP d/b/a Sprint PCS et al.*, Case No. TXED-2-17-cv-00662, filed Apr. 24, 2018; 21 pages.
The T-Mobile and Sprint Defendants' Response to Plaintiff Intellectual Ventures' Opening Supplemental Brief [134], filed in *Intellectual Ventures II LLC v. Sprint Spectrum LP d/b/a Sprint PCS et al.*, Case No. TXED-2-17-cv-00662, filed May 15, 2018; 22 pages.
The T-Mobile and Sprint Defendants' Sur-Reply to Plaintiff [139], filed in *Intellectual Ventures II LLC v. Sprint Spectrum LP d/b/a Sprint PCS et al.*, Case No. TXED-2-17-cv-00662, filed May 29, 2018; 10 pages.
Plaintiff Intellectual Ventures II LLC's Notice of Supplemental Authority [141], filed in *Intellectual Ventures II LLC v. Sprint*

(56) References Cited

OTHER PUBLICATIONS

Spectrum LP d/b/a Sprint PCS et al., Case No. TXED-2-17-cv-00662, filed Jun. 5, 2018; 4 pages.
The T-Mobile and Sprint Defendants' Response to IV's Notice of Supplemental Authority [143], filed in *Intellectual Ventures II LLC v. Sprint Spectrum LP* d/b/a Sprint PCS et al., Case No. TXED-2-17-cv-00662, Jun. 7, 2018; 5 pages.
Ericsson's Sur-Sur-reply [144], filed in *Intellectual Ventures II LLC v. Sprint Spectrum LP* d/b/a Sprint PCS et al., Case No. TXED-2-17-cv-00662, filed Jun. 11, 2018; 6 pages.
Defendants' Unopposed Motion for Leave to Amend Invalidity Contentions [153], filed in *Intellectual Ventures II LLC v. Sprint Spectrum LP* d/b/a Sprint PCS et al., Case No. TXED-2-17-cv-00662, Jun. 28, 2018; 6 pages.
The T-Mobile and Sprint Defendants' Notice of Supplemental Authority [154], filed in *Intellectual Ventures II LLC v. Sprint Spectrum LP* d/b/a Sprint PCS et al., Case No. TXED-2-17-cv-00662, filed Jun. 29, 2018; 4 pages.
Order [157], filed in *Intellectual Ventures II LLC v. Sprint Spectrum LP* d/b/a Sprint PCS et al., Case No. TXED-2-17-cv-00662, filed Jun. 29, 2018; 1 page.
Plaintiff Intellectual Ventures II LLC's Response to the T-Mobile and Sprint Defendants' Notice of Supplemental Authority [160], filed in *Intellectual Ventures II LLC v. Sprint Spectrum LP* d/b/a Sprint PCS et al., Case No. TXED-2-17-cv-00662, filed Jul. 5, 2018; 4 pages.
Plaintiff Intellectual Ventures II LLC's Unopposed Motion for Leave to Amend Infringement Contentions [161], filed in *Intellectual Ventures II LLC v. Sprint Spectrum LP* d/b/a Sprint PCS et al., Case No. TXED-2-17-cv-00662, filed Jul. 9, 2018; 4 pages.
Order [163], filed in *Intellectual Ventures II LLC v. Sprint Spectrum LP* d/b/a Sprint PCS et al., Case No. TXED-2-17-cv-00662, filed Jul. 10, 2018; 1 page.
P.R. 4-3 Joint Claim Construction and Prehearing Statement [175], filed in *Intellectual Ventures II LLC v. Sprint Spectrum LP* d/b/a Sprint PCS et al., Case No. TXED-2-17-cv-00662, filed Aug. 10, 2018; 7 pages.
Joint Motion for Leave to Amend P.R. 4-3 Joint Claim Construction and Prehearing Statement [176], filed in *Intellectual Ventures II LLC v. Sprint Spectrum LP* d/b/a Sprint PCS et al., Case No. TXED-2-17-cv-00662, filed Sep. 10, 2018; 7 pages.
Order Granting Joint Motion for Leave to Amend P.R. 4-3 [177], filed in *Intellectual Ventures II LLC v. Sprint Spectrum LP* d/b/a Sprint PCS et al., Case No. TXED-2-17-cv-00662, filed Sep. 12, 2018; 2 pages.
Plaintiff Intellectual Ventures II LLC's Opening Claim Construction Brief [180], filed in *Intellectual Ventures II LLC v. Sprint Spectrum LP* d/b/a Sprint PCS et al., Case No. TXED-2-17-cv-00662, filed Sep. 14, 2018; 29 pages.
Order Denying Defendants' Motions to Dismiss [183], filed in *Intellectual Ventures II LLC v. Sprint Spectrum LP* d/b/a Sprint PCS et al., Case No. TXED-2-17-cv-00662, filed Sep. 18, 2018; 8 pages.
Order and Opinion on Defendants' Motion to Dismiss [189], filed in *Intellectual Ventures II LLC v. Sprint Spectrum LP* d/b/a Sprint PCS et al., Case No. TXED-2-17-cv-00662, filed Sep. 24, 2018; 19 pages.
Defendants' Responsive Claim Construction Brief [194], filed in *Intellectual Ventures II LLC v. Sprint Spectrum LP* d/b/a Sprint PCS et al., Case No. TXED-2-17-cv-00662, filed Oct. 3, 2018; 36 pages.
Ericsson's Answer to IV's Complaint [201], filed in *Intellectual Ventures II LLC v. Sprint Spectrum LP* d/b/a Sprint PCS et al., Case No. TXED-2-17-cv-00662, filed Oct. 10, 2018; 62 pages.
Ericsson's Answer to IV's Complaint [202], filed in *Intellectual Ventures II LLC v. Sprint Spectrum LP* d/b/a Sprint PCS et al., Case No. TXED-2-17-cv-00662, filed Oct. 10, 2018; 56 pages.
Plaintiff's Reply Claim Construction Brief [207], filed in *Intellectual Ventures II LLC v. Sprint Spectrum LP* d/b/a Sprint PCS et al., Case No. TXED-2-17-cv-00662, filed Oct. 15, 2018; 14 pages.

Sprint's Sealed Answer, Affirmative Defenses, and Counterclaims [208], filed in *Intellectual Ventures II LLC v. Sprint Spectrum LP* d/b/a Sprint PCS et al., Case No. TXED-2-17-cv-00662, filed Oct. 17, 2018; 54 pages.
T-Mobile USA, Inc., and T-Mobile US, Inc.'s [redacted] Answer and Counterclaims to IV's Complaint [209], filed in *Intellectual Ventures II LLC v. Sprint Spectrum LP* d/b/a Sprint PCS et al., Case No. TXED-2-17-cv-00662, filed Oct. 17, 2018; 57 pages.
P.R. 4-5 Joint Claim Construction Chart [210], filed in *Intellectual Ventures II LLC v. Sprint Spectrum LP* d/b/a Sprint PCS et al., Case No. TXED-2-17-cv-00662, filed Oct. 17, 2018; 33 pages.
Docket History, *Intellectual Ventures II LLC v. T-Mobile USA, Inc.* f/k/a MetroPCS Communications, Inc. et al, Case No. TXED-2-17-cv-00661, filed Sep. 21, 2017; 3 pages.
Docket History, *Intellectual Ventures II LLC v. Sprint Spectrum LP* d/b/a Sprint PCS et al., Case No. TXED-2-17-cv-00662, filed Sep. 21, 2017; 11 pages.
Patent Owner's Preliminary Response, filed in *Ericsson Inc., v. Intellectual Ventures II LLC*, Case. No. IPR2018-01380 (P.T.A.B), Paper 6, filed Nov. 9, 2018; 32 pages.
P.R. 4-5 Joint Claim Construction Chart, *Intellectual Ventures II, LLC v. Sprint Spectrum L.P.*, Case No. 2:17-cv-662-JRG-RSP (Oct. 17, 2018), filed in *Ericsson Inc., v. Intellectual Ventures II LLC*, Case. No. IPR2018-01380 (P.T.A.B), Exhibit 2001, filed Nov. 9, 2018; 33 pages.
R2-061152, Draft Report of the RAN1-RAN2 LTE Joint Session (Athens, Mar. 29, 2006), filed in *Ericsson Inc., v. Intellectual Ventures II LLC*, Case. No. IPR2018-01380 (P.T.A.B), Exhibit 2002, filed Nov. 9, 2018; 20 pages.
3GPP Delegates Corner, available at http://www.3gpp.org/specifications-groups/delegates-corner, filed in *Ericsson Inc., v. Intellectual Ventures II LLC*, Case. No. IPR2018-01380 (P.T.A.B), Exhibit 2003, filed Nov. 9, 2018; 6 pages.
Petition for Inter Partes Review, filed in *Ericsson Inc., v. Intellectual Ventures II LLC*, Case No. IPR2018-01666 (P.T.A.B), Paper 1, filed Sep. 6, 2018; 83 pages.
Prosecution File History of the '330 Patent, filed in *Ericsson Inc., v. Intellectual Ventures II LLC*, Case No. IPR2018-01666 (P.T.A.B.), Exhibit 1002, filed Sep. 6, 2018; 196 pages.
Declaration of Dr. Vijay K. Madisetti, filed in *Ericsson Inc., v. Intellectual Ventures II LLC*, Case No. IPR2018-01666 (P.T.A.B.), Exhibit 1003, filed Sep. 6, 2018; 133 pages.
CV of Dr. Vijay K. Madisetti, filed in *Ericsson Inc., v. Intellectual Ventures II LLC*, Case No. IPR2018-01666 (P.T.A.B.), Exhibit 1004, filed Sep. 6, 2018; 29 pages.
Catt, "PCH mapping and Paging Control," published Mar. 24, 2006, prior to 3GPP RAN1/RAN2 joint meeting on LTE, Athens, Greece, Mar. 27-31, 2006, R2-060988, filed in *Ericsson Inc., v. Intellectual Ventures II LLC*, Case No. IPR2018-01666 (P.T.A.B.), Exhibit 1005, filed Sep. 6, 2018; 5 pages.
First Amended T-Mobile and Ericsson Infringement Contentions, Jan. 30, 2018, filed in *Ericsson Inc., v. Intellectual Ventures II LLC*, Case No. IPR2018-01666 (P.T.A.B.), Exhibit 1006, filed Sep. 6, 2018; 58 pages.
Catt, "LTE MAC scheduling with TP," 3GPP TSG-RAN2 Meeting #52, Athens, Greece, Mar. 27-31, 2006, R2-060990, filed in *Ericsson Inc., v. Intellectual Ventures II LLC*, Case No. IPR2018-01666 (P.T.A.B.), Exhibit 1008, filed Sep. 6, 2018; 5 pages.
Holma, Harri & Toskala, Antti, *WCDMA for UMTS: Radio Access for Third Generation Mobile Communications* (revised ed. 2001), filed in *Ericsson Inc., v. Intellectual Ventures II LLC*, Case No. IPR2018-01666 (P.T.A.B.), Exhibit 1010, filed Sep. 6, 2018; 120 pages.
3rd Generation Partnership Project; Technical Specification Group Radio Access Network; Evolved Universal Terrestrial Radio Access (E-UTRA); Multiplexing and channel coding (Release 8), 3GPP TS 36.212 V8.8.0 (Dec. 2009), filed in *Ericsson Inc., v. Intellectual Ventures II LLC*, Case No. IPR2018-01666 (P.T.A.B.), Exhibit 1011, filed Sep. 6, 2018; 60 pages.
Rappaport, Theodore, *Wireless Communications, Principles & Practices* (1st ed. 1996), filed in *Ericsson Inc., v. Intellectual Ventures II LLC*, Case No. IPR2018-01666 (P.T.A.B.), Exhibit 1012, filed Sep. 6, 2018; 35 pages.

(56) References Cited

OTHER PUBLICATIONS

3GPP Technical Report, Technical Specification Group Radio Access Network, Evolved Universal Terrestrial Radio Access (EUTRA) and Evolved Universal Terrestrial Radio Access Network (E-UTRAN), Radio Interface Protocol Aspects (Release 7), TR 25.813, v.0.6.0 (Mar. 2006), filed in *Ericsson Inc.*, v. *Intellectual Ventures II LLC*, Case No. IPR2018-01666 (P.T.A.B.), Exhibit 1013, filed Sep. 6, 2018; 30 pages.
Ekström, Hannes et al., "Technical Solutions for the 3G Long-Term Evolution," *IEEE Communications Magazine*, Mar. 2006, pp. 38-45, filed in *Ericsson Inc.*, v. *Intellectual Ventures II LLC*, Case No. IPR2018-01666 (P.T.A.B.), Exhibit 1014, filed Sep. 6, 2018; 8 pages.
3GPP Technical Specification, Universal Mobile Telecommunications System (UMTS); UTRAN Iu Interface Radio Access Network Application Part (RANAP) Signalling (Release 7), TS 25.413, v.7.0.0 (Dec. 2005), filed in *Ericsson Inc.*, v. *Intellectual Ventures II LLC*, Case No. IPR2018-01666 (P.T.A.B.), Exhibit 1015, filed Sep. 6, 2018; 332 pages.
Newton, Harry, *Newton's Telecom Dictionary* (14th ed. 1998) (selected pages), filed in *Ericsson Inc.*, v. *Intellectual Ventures II LLC*, Case No. IPR2018-01666 (P.T.A.B.), Exhibit 1017, filed Sep. 6, 2018; 5 pages.
3GPP Technical Report, Technical Specification Group Radio Access Network, Evolved Universal Terrestrial Radio Access (E-UTRA) and Evolved Universal Terrestrial Radio Access Network (E-UTRAN), Radio Interface Protocol Aspects (Release 7), TR 25.813, v.0.6.0 (Mar. 2006) (same as Ex. 1013 but accepting all changes shown in document as track changes; references to the document are to Ex. 1013), filed in *Ericsson Inc.*, v. *Intellectual Ventures II LLC*, Case No. IPR2018-01666 (P.T.A.B.), Exhibit 1018, filed Sep. 6, 2018; 26 pages.
IEEE Xplore Abstract page for Ekström (Ex. 1014), found at https://ieeexplore.ieee.org/document/1607864/, filed in *Ericsson Inc.*, v. *Intellectual Ventures II LLC*, Case No. IPR2018-01666 (P.T.A.B.), Exhibit 1019, filed Sep. 6, 2018; 2 pages.
Ericsson, "Paging for E-UTRA," 3GPP TSG-RAN WG1 LTE AdHoc Meeting, Helsinki, Finland, Jan. 23-25, 2006, R1-060092, filed in *Ericsson Inc.*, v. *Intellectual Ventures II LLC*, Case No. IPR2018-01666 (P.T.A.B.), Exhibit 1020, filed Sep. 6, 2018; 1 page.
Ericsson, "Text Proposal on E-UTRA Paging," 3GPP TSG-RAN WG1 LTE AdHoc Meeting, Helsinki, Finland, Jan. 23-25, 2006, R1-060093, filed in *Ericsson Inc.*, v. *Intellectual Ventures II LLC*, Case No. IPR2018-01666 (P.T.A.B.), Exhibit 1021, filed Sep. 6, 2018; 1 page.
3GPP Technical Report, Technical Specification Group Radio Access Network, Evolved Universal Terrestrial Radio Access (E-UTRA) and Evolved Universal Terrestrial Radio Access Network (E-UTRAN), Radio Interface Protocol Aspects (Release 7), TR 25.813, v.0.3.0 (Jan. 2006), filed in *Ericsson Inc.*, v. *Intellectual Ventures II LLC*, Case No. IPR2018-01666 (P.T.A.B.), Exhibit 1022, filed Sep. 6, 2018; 26 pages.
Universal Mobile Telecommunications System (UMTS); Multiplexing and channel coding (FDD), 3GPP TS 25.212, v.6.7.0 Release 6 (Dec. 2005), filed in *Ericsson Inc.*, v. *Intellectual Ventures II LLC*, Case No. IPR2018-01666 (P.T.A.B.), Exhibit 1023, filed Sep. 6, 2018; 84 pages.
3GPP Technical Report, Technical Specification Group Radio Access Network, Evolved Universal Terrestrial Radio Access (E-UTRA) and Evolved Universal Terrestrial Radio Access Network (E-UTRAN), Physical Layer Aspects for Evolved UTRA (Release 7), TR 25.814, v.1.0.1 (Nov. 2005), filed in *Ericsson Inc.*, v. *Intellectual Ventures II LLC*, Case No. IPR2018-01666 (P.T.A.B.), Exhibit 1024, filed Sep. 6, 2018; 72 pages.
Declaration of Craig Bishop, filed in *Ericsson Inc.*, v. *Intellectual Ventures II LLC*, Case No. IPR2018-01666 (P.T.A.B.), Exhibit 1030, filed Sep. 6, 2018; 892 pages.
Declaration of Sven Ekemark, filed in *Ericsson Inc.*, v. *Intellectual Ventures II LLC*, Case No. IPR2018-01666 (P.T.A.B.), Exhibit 1031, filed Sep. 6, 2018; 736 pages.

3GPP Technical Specification, Radio Resource Control (RRC); Protocol specification; TS 25.331, v6.8.0 (Dec. 2005), filed in *Ericsson Inc.*, v. *Intellectual Ventures II LLC*, Case No. IPR2018-01666 (P.T.A.B.), Exhibit 1037, filed Sep. 6, 2018; 1174 pages.
Petition for Inter Partes Review, filed in *Sprint Spectrum L.P.* v. *Intellectual Ventures II LLC*, Case No. IPR2018-01777 (P.T.A.B), Paper 1, filed Sep. 21, 2018; 77 pages.
Declaration of Dr. Martin G. Walker, filed in *Sprint Spectrum L.P.* v. *Intellectual Ventures II LLC*, Case No. IPR2018-01777 (P.T.A.B), Exhibit 1002, filed Sep. 21, 2018; 71 pages.
CV of Dr. Martin G. Walker, filed in *Sprint Spectrum L.P.* v. *Intellectual Ventures II LLC*, Case No. IPR2018-01777 (P.T.A.B), Exhibit 1003, filed Sep. 21, 2018; 27 pages.
Prosecution File History of U.S. Appl. No. 14/222, issued as the '330 Patent, filed in *Sprint Spectrum L.P.* v. *Intellectual Ventures II LLC*, Case No. IPR2018-01777 (P.T.A.B), Exhibit 1004, filed Sep. 21, 2018; 200 pages.
3rd Generation Partnership Project; Technical Specification Group Services and System Aspects; Multimedia Broadcast/Multicast Service (MBMS); Architecture and functional description (Release 6) v6.9.0 (Dec. 2005), filed in *Sprint Spectrum L.P.* v. *Intellectual Ventures II LLC*, Case No. IPR2018-01777 (P.T.A.B), Exhibit 1005, filed Sep. 21, 2018; 47 pages.
3rd Generation Partnership Project TR 25.813; Technical Specification Group Radio Access Network; Evolved Universal Terrestrial Radio Access (E-UTRA) and Evolved Universal Terrestrial Radio Access Network (E-UTRAN); Radio interface protocol aspects (Release 7) v0.8.1 (Apr. 2006) (appears Petitioner filed the wrong document or labelled it wrongly in the exhibit list), filed in *Sprint Spectrum L.P.* v. *Intellectual Ventures II LLC*, Case No. IPR2018-01777 (P.T.A.B), Exhibit 1006, filed Sep. 21, 2018; 26 pages.
3rd Generation Partnership Project TS 25.304; Technical Specification Group Radio Access Network; Evolved Universal Terrestrial Radio Access Network; User Equipment (UE) procedures in idle mode and procedures for cell reselection in connected mode (Release 7) v7.0.0 (Mar. 2006) (appears Petitioner filed the wrong document or labelled it wrongly in the exhibit list), filed in *Sprint Spectrum L.P.* v. *Intellectual Ventures II LLC*, Case No. IPR2018-01777 (P.T.A.B), Exhibit 1007, filed Sep. 21, 2018; 38 pages.
3GPP TS 25.211; Technical Specification Group Radio Access Network; Physical channels and mapping of transport channels onto physical channels (FDD) (Release 7) v7.0.0 (Mar. 2006), filed in *Sprint Spectrum L.P.* v. *Intellectual Ventures II LLC*, Case No. IPR2018-01777 (P.T.A.B), Exhibit 1008, filed Sep. 21, 2018; 51 pages.
U.S. Appl. No. 60/795,675, filed in *Sprint Spectrum L.P.* v. *Intellectual Ventures II LLC*, Case No. IPR2018-01777 (P.T.A.B), Exhibit 1010, filed Sep. 21, 2018; 24 pages.
U.S. Appl. No. 60/757,063, filed in *Sprint Spectrum L.P.* v. *Intellectual Ventures II LLC*, Case No. IPR2018-01777 (P.T.A.B), Exhibit 1012, filed Sep. 21, 2018; 75 pages.
U.S. Appl. No. 60/783,250, filed in *Sprint Spectrum L.P.* v. *Intellectual Ventures II LLC*, Case No. IPR2018-01777 (P.T.A.B), Exhibit 1013, filed Sep. 21, 2018; 179 pages.
U.S. Appl. No. 60/784,680, filed in *Sprint Spectrum L.P.* v. *Intellectual Ventures II LLC*, Case No. IPR2018-01777 (P.T.A.B), Exhibit 1014, filed Sep. 21, 2018; 22 pages.
Phillips, "Evolved Paging for LTE," published Feb. 13, 2006, prior to 3GPP TSG-RAN WG2 Meeting #51, Denver, USA, Feb. 13-17, 2006, filed in *Sprint Spectrum L.P.* v. *Intellectual Ventures II LLC*, Case No. IPR2018-01777 (P.T.A.B), Exhibit 1015, filed Sep. 21, 2018; 4 pages.
Sharp, R1-061136, "UE Identity in L1/L2 Downlink Control Signalling," Apr. 28, 2006, filed in *Sprint Spectrum L.P.* v. *Intellectual Ventures II LLC*, Case No. IPR2018-01777 (P.T.A.B), Exhibit 1016, filed Sep. 21, 2018; 7 pages.
Nokia, et al., "E-UTRA Transport Channels," published prior to 3GPP TSG-RAN WG2 Meeting #48bis, Cannes, France, Oct. 10-14, 2005, R2-052438, filed in *Sprint Specfrum L.P.* v. *Intellectual Ventures II LLC*, Case No. IPR2018-01777 (P.T.A.B), Exhibit 1017, filed Sep. 21, 2018; 3 pages.
Ericsson, "Paging for E-UTRA," 3GPP TSG-RAN WG1 LTE AdHoc Meeting, Helsinki, Finland, Jan. 23-25, 2006, R1-060092,

(56) References Cited

OTHER PUBLICATIONS filed in *Sprint Spectrum L.P. v. Intellectual Ventures II LLC*, Case No. IPR2018-01777 (P.T.A.B), Exhibit 1018, filed Sep. 21, 2018; 1 page.
"Universal Mobile Telecommunications System (UMTS);Multimedia Broadcast/Multicast Service (MBMS; Architecture and Functional Description (3GPP TS 23.246 version 6.8.0 Release 6)," Sep. 2005). ETSI TS 123 246 v6.8.0:1-49.
3GPP Interlayer procedures in Connected Mode, Jun. 2002, 3GPP TS 25.303 V3.12.0 (Jun. 2002).
3GPP UTRAN Functions, Examples on Signaling Procedures, Jun. 2002, 3GPP TR 25.931 V3.7.0 (Jun. 2002).
3GPP, Physical channels and mapping of transport channels onto physical channels (TOO) (Release 7), 3GPP TS 25.221, 3GPP, Mar. 2006, V7.0.0., p. 84.
"3rd Generation Partnership Project; Technical Specification Group Services and System Aspects; Multimedia Broadcast/Multicast Service (MBMS); Architecture and functional description (Release 6)," (Sep. 2004). 3GPP: Valbonne, France, TS 23.246 v6.4.0:1-42.
English Summary of Office Action Dated Jun. 3, 2011 from the Japanese Patent Office from Japanese Patent Application No. 2009-508324.
Ericsson, Paging for E-UTRA, Feb. 13-17, 2006, R1-060576; TSG-RAN WG1 #44.
Final Rejection, U.S. Appl. No. 11/416,865, dated Mar. 4, 2010.
Final Rejection, U.S. Appl. No. 11/416,865, dated May 6, 2011.
International Search Report and Written Opinion dated Aug. 13, 2007, for PCT/EP2007/054161 filed Apr. 27, 2007, 14 pages.
IPWireless, Initial Cell Access Procedure in L TE, 3GPP TSG RAN WG2 #51, 3GPP, Feb. 13, 2006, R2-060380, URL, http://www.3gpp.org/ftp/lsg_ran/WG2_RL2/TSGR2_51/Documents/R2-060380.zip.
Non-Final Rejection, U.S. Appl. No. 11/416,865, dated Jun. 22, 2009.
Non-Final Rejection, U.S. Appl. No. 11/416,865, dated Oct. 5, 2010.
Notice of Allowance, U.S. Appl. No. 11/416,865, dated Nov. 12, 2013.
Office Action, Japanese Patent Application No. 2011-198526, dated Nov. 16, 2012.
Office Action, Korean Patent Application No. 200780021642.8, dated Apr. 13, 2010.
Office Action, Korean Patent Application No. 200780021642.8, dated Aug. 12, 2011.
Office Action, Korean Patent Application No. 200780021642.8, dated Mar. 30, 2012.
Office Action. Japanese Patent Application No. 2009-508324, dated Jan. 4, 2012.
Radio Electronics. com. "UMTSIWCDMA tutorial [2]—the basic system architecture including the User Equipment—UE —the Radio Network Subsystem, and the Core Ne~ork," located at <http://www.radioelectronics.com/info/cellulartelecomms/umts/umts_wcdma_architecture.php> visited on Jun. 29, 2007. (3 pages).
Radio Electronics. com. "UMTSIWCDMA tutorial (1)—a tutorial about the 3G Wideband COMA, WCOMA, or UMTS cellular telecommunications system," located at <http://www.radioelectronics.com/info/cellulartelecomms/umts/umts_wcdma_tutorial.php> visited on Jun. 29, 2007. (3 pages).
Radio Electronics. com. "UMTSIWCOMA tutorial (3)—the air intetiace, frequencies, spreading and power control used within UMTS or Wideband COMA, WCOMA, cellular telecommunications system," located at <http://www.radioelectronics.com/info/cellulartelecomms/umts/umts_wcdma_radio.php> visited on Jun. 29, 2007. (4 pages).
Radio Electronics. com. "UMTSIWCOMA tutorial (4)—the frames slots and channels used within UMTS or Wideband COMA, WCOMA, cellular telecommunications system," located at http://www.radio-electronics.com/info/cellulartelecomms/umts/umts_wcdma_channels.php visited on Jun. 29, 2007. (4 pages).
Radio Electronics. com. "UMTSIWCOMA tutorial [5]—packet data, speech coding and handover used within UMTS or Wideband COMA cellular telecommunication system," located at <http://www.radioelectronics. com/info/cellulartelecomms/umts/umts_wcdma_coding_handover.php> visited on Jun. 29, 2007. (3 pages}.
Vodafone Group, Modelling of the L TE RRC Active state, 3GPP TSG RAN WG2 #52, 3GPP, Apr. 27, 2006, R2-060957, URL, hllp:l/www.3gpp.org/flp/lsg_ran/WG2_RL2/TSGR2_52/Documents/R2-060957.zip.
Non-Final Rejection, U.S. Appl. No. 14/222,140, dated Aug. 13, 2015.
Non-Final Rejection, U.S. Appl. No. 14/222,140, dated Jan. 29, 2016.
Notice of Allowance, U.S. Appl. No. 14/222,140, dated Aug. 17, 2016.
Non-Final Rejection, U.S. Appl. No. 15/385,120, dated May 4, 2017.
Notice of Allowance, U.S. Appl. No. 15/385,120, dated Nov. 29, 2017.
Decision to Institute, filed in *Ericsson Inc. v. Intellectual Ventures II LLC*, Case. No. IPR2018-01380 (P.T.A.B.), Paper 7, filed Jan. 14, 2019; 44 pages.
Patent Owner's Response, filed in *Ericsson Inc. v. Intellectual Ventures II LLC*, Case. No. IPR2018-01380 (P.T.A.B.), Paper 13, filed Apr. 22, 2019; 63 pages.
Declaration of Jonathan Wells, Ph.D., filed in *Ericsson Inc. v. Intellectual Ventures II LLC*, Case. No. IPR2018-01380 (P.T.A.B.). Exhibiy 2004, filed Apr. 22, 2019; 62 pages.
Curriculum Vitae of Jonathan Wells, Ph.D., filed in *Ericsson Inc. v. Intellectual Ventures II LLC*, Case. No. IPR2018-01380 (P.T.A.B.), Exhibit 2005, filed Apr. 22, 2019, 11 pages.
Catt, R1-061537, Paging control and paging channels, 3GPP TSG RAN1#45 meeting ("CATT3"), filed in *Ericsson Inc. v. Intellectual Ventures II LLC*, Case. No. IPR2018-01380 (P.T.A.B.), Exhibit 2006, filed Apr. 22, 2019; 3 pages.
Catt contributions on LTE for RAN1#45, 3GPP_TSG_RAN WG1 Archives, dated Apr. 2, 2019, available at https://list.etsi.org/scripts/wa.exe?A2=ind0605A&L=3GPP_TSG_RAN_WG1&P=41075, filed in *Ericsson Inc. v. Intellectual Ventures II LLC*, Case. No. IPR2018-01380 (P.T.A.B.), Exhibit 2007, filed Apr. 22, 2019; 17 pages.
www.3gpp.org/ftp/tsg_ran/WG1_RL1/TSGR1_45/Docs, dated Apr. 2, 2019, filed in *Ericsson Inc. v. Intellectual Ventures II LLC*, Case. No. IPR2018-01380 (P.T.A.B.), Exhibit 2008, filed Apr. 22, 2019; 11 pages.
Deposition Testimony of Dr. Madisetti (Apr. 9, 2019), filed in *Ericsson Inc. v. Intellectual Ventures II LLC*, Case. No. IPR2018-01380 (P.T.A.B.), Exhibit 2009, filed Apr. 22, 2019; 56 pages.
Taiwo Oyedele, Charging Requirements for UMTS Packet-Switched Data Services, Chalmers University of Technology (2001), filed in *Ericsson Inc. v. Intellectual Ventures II LLC*, Case. No. IPR2018-01380 (P.T.A.B.), Exhibit 2010, filed Apr. 22, 2019; 100 pages.
Zhongping Zhang et al., Advanced baseband technology in third-generation radio base stations, Ericsson Review No. 1 (2003), filed in *Ericsson Inc. v. Intellectual Ventures II LLC*, Case. No. IPR2018-01380 (P.T.A.B.), Exhibit 2011, filed Apr. 22, 2019; 10 pages.
Satoshi Maruyama et al., Base Transceiver Station for W-CDMA System, Fujitsu Sci. Tech J. 38(2): pp. 167-173 (2002), filed in *Ericsson Inc. v. Intellectual Ventures II LLC*, Case. No. IPR2018-01380 (P.T.A.B.), Exhibit 2012, filed Apr. 22, 2019; 7 pages.
Patent Owner's Preliminary Response, filed in *Sprint Spectrum L.P. v. Intellectual Ventures II LLC*, Case No. IPR2018-01775 (P.T.A.B.), Paper 9, filed Jan. 3, 2019; 35 pages.
Decision Denying Institution of *Inter Partes* Review, filed in *Sprint Spectrum L.P. v. Intellectual Ventures II LLC*, Case. No. IPR2018-01775 (P.T.A.B.), Paper 10, filed Mar. 18, 2019; 28 pages.
Prosecution History of U.S. Pat. No. 8,135,420 to Lee et al., filed in *Sprint Spectrum L.P. v. Intellectual Ventures II LLC*, Case. No. IPR2018-01775 (P.T.A.B.), Exhibit 2001, filed Jan. 3, 2019; 5,585 pages. (5 Parts.).
Andrew W. Davis, Modulation Schemes: Moving Digital Data With Analog Signals, EETimes (Oct. 4, 1997), filed in *Sprint Spectrum*

(56) References Cited

OTHER PUBLICATIONS

L.P. v. *Intellectual Ventures II LLC*, Case. No. IPR2018-01775 (P.T.A.B.), Exhibit 2002, filed Jan. 3, 2019; 11 pages.

Technical Specification Group Radio Access Network, Physical Channels and mapping of Transport Channels Onto Physical Channels (TDD), 3GPP TS25.221 V7.0.0 (Mar. 2006), filed in *Sprint Spectrum L.P. v. Intellectual Ventures II LLC*, Case. No. IPR2018-01775 (P.T.A.B.), Exhibit 2003, filed Jan. 3, 2019; 139 pages.

Petition for *Inter Partes* Review, filed in *Nokia of America Corporation v. Intellectual Ventures II LLC*, Case. No. IPR2019-00667 (P.T.A.B.), Paper 2, filed Feb. 13, 2019; 80 pages.

Prosecution File History of the '357 Patent, filed in *Nokia of America Corporation v. Intellectual Ventures II LLC*, Case. No. IPR2019-00667 (P.T.A.B.), Exhibit 1002, filed Feb. 13, 2019; 583 pages.

Declaration of Dr. Vijay K. Madisetti, filed in *Nokia of America Corporation v. Intellectual Ventures II LLC*, Case. No. IPR2019-00667 (P.T.A.B.), Exhibit 1003, filed Feb. 13, 2019; 96 pages.

Curriculum Vitae of Dr. Vijay K. Madisetti, filed in *Nokia of America Corporation v. Intellectual Ventures II LLC*, Case. No. IPR2019-00667 (P.T.A.B.), Exhibit 1004, filed Feb. 13, 2019; 29 pages.

Catt, "PCH mapping and Paging Control," published Mar. 24, 2006, prior to 3GPP RAN1/RAN2 joint meeting on LTE, Athens, Greece, Mar. 27-31, 2006, R2-060988 ("CATT"), filed in *Nokia of America Corporation v. Intellectual Ventures II LLC*, Case. No. IPR2019-00667 (P.T.A.B.), Exhibit 1005, filed Feb. 13, 2019; 5 pages.

LG Electronics, "Discussion on LTE Paging and DRX," published Mar. 23, 2006, prior to Joint RAN WG1 and RAN WG2 on LTE, Athens, Greece, Mar. 27-31, 2006, R2-061014 ("LG"), filed in *Nokia of America Corporation, v. Intellectual Ventures II LLC*, Case. No. IPR2019-00667 (P.T.A.B.), Exhibit 1006, filed Feb. 13, 2019, 2 pages.

CATT and RITT, "Access Procedure for TDD," published Mar. 23, 2006, prior to 3GPP RAN1/RAN2 joint meeting on LTE, Athens, Greece, Mar. 27-31, 2006, R2-060905 ("CATT2"), filed in *Nokia of America Corporationv. Intellectual Ventures II LLC*, Case. No. IPR2019-00667 (P.T.A.B.), Exhibit 1007, filed Feb. 13, 2019; 4 pages.

Huawei, "Inter-cell Interface Mitigation," 3GPP TSG RAN WG1 Ad Hoc on LTE, Sophia Antipolis, France, Jun. 20-21, 2005, R1-050629 ("Huawei"), filed in *Nokia of America Corporationv. Intellectual Ventures II LLC*, Case. No. IPR2019-00667 (P.T.A.B.), Exhibit 1008, filed Feb. 13, 2019; 3 pages.

Harri Holma & Antti Toskala, WCDMA for UMTS: Radio Access for Third Generation Mobile Communications, Rev. ed. (2001) ("Holma"), filed in *Nokia of America Corporation v. Intellectual Ventures II LLC*, Case. No. IPR2019-00667 (P.T.A.B.), Exhibit 1010, filed Feb. 13, 2019; 120 pages.

Andrew Richardson, WCDMA Design Handbook (2005) ("Richardson"), filed in *Nokia of America Corporation v. Intellectual Ventures II LLC*, Case No. IPR2019-00667 (P.T.A.B.), Exhibit 1011, filed Feb. 13, 2019; 68 pages.

Theodore S. Rappaport, Wireless Communications, Principles & Practies, 1st ed., (1996) ("Rappaport"), filed in *Nokia of America Corporationv. Intellectual Ventures II LLC*, Case. No. IPR2019-00667 (P.T.A.B.), Exhibit 1012, filed Feb. 13, 2019; 35 pages.

3GPP Technical Report, Technical Specification Group Radio Access Network, Evolved Universal Terrestrial Radio Access (E-UTRA) and Evolved Universal Terrestrial Radio Access Network (E-UTRAN), Radio Interface Protocol Aspects (Release 7) TR 25.813, v.0.6.0 (Mar. 2006) ("TR25.813"), filed in *Nokia of America Corporation v. Intellectual Ventures II, LLC*, Case. No. IPR2019-00667 (P.T.A.B.), Exhibit 1013, filed Feb. 13, 2019; 30 pages.

Hannes Ekström et al., "Technical Solutions for the 3G Long-Term Evolutions," IEEE Communications Magazine, Mar. 2006, pp. 38-45 ("Ekström"), filed in *Nokia of America Corporationv. Intellectual Ventures II LLC*, Case. No. IPR2019-00667 (P.T.A.B.), Exhibit 1014, filed Feb. 13, 2019; 8 pages.

Declaration of Craig Bishop, filed in *Nokia of America Corporation v. Intellectual Ventures II LLC*, Case. No. IPR2019-00667 (P.T.A.B.), Exhibit 1015, filed Feb. 13, 2019; 263 pages.

Declaration of Sven Ekemark, filed in *Nokia of America Corporation v. Intellectual Ventures II LLC*, Case. No. IPR2019-00667 (P.T.A.B.), Exhibit 1016, filed Feb. 13, 2019; 187 pages.

Harry Newton, Newton's Telecom Dictionary, 14th Ed. (1998) (selected pages) ("Newton"), filed in *Nokia of America Corporation v. Intellectual Ventures II LLC*, Case. No. IPR2019-00667 (P.T.A.B.), Exhibit 1017, filed Feb. 13, 2019; 4 pages.

3GPP Technical Report, Technical Specification Group Radio Access Network, Evolved Universal Terrestrial Radio Access (E-Utra) and Evolved Universal Terrestrial Radio Access Network (E-Utran), Radio Interface Protocol Aspects (Release 7), TR 25.813, v.0.6.0 (Mar. 2006) (same as Ex. 1013 but accepting all changes shown in document as track changes; references to the document are to Ex. 1013), filed in *Nokia of America Corporation v. Intellectual Ventures II LLC*, Case. No. IPR2019-00667 (P.T.A.B.), Exhibit 1018, filed Feb. 13, 2019; 26 pages.

IEEE XPlore Abstract page For Ekström, found at https://ieeexplore.ieee.org/document/1607864/, Ex. 1014, filed in *Nokia of America Corporation v. Intellectual Ventures II LLC*, Case. No. IPR2019-00667 (P.T.A.B.), Exhibit 1019, filed Feb. 13, 2019; 2 pages.

Patent Owner's Preliminary Response, filed in *Ericsson Inc. v. Intellectual Ventures II LLC*, Case. No. IPR2018-01666 (P.T.A.B.), Paper 6, filed Dec. 27, 2018; 55 pages.

Decision Institution of *Inter Partes* Review, filed in *Ericsson Inc. v. Intellectual Ventures II LLC*, Case. No. IPR2018-01666 (P.T.A.B.), Paper 7, filed Mar. 25, 2019; 43 pages.

The Authoritative Dictionary of IEEE Standards Terms, p. 290 (2000), filed in *Ericsson Inc.v. Intellectual Ventures II LLC*, Case. No. IPR2018-01666 (P.T.A.B.), Exhibit 2001, filed Dec. 27, 2018; 6 pages.

The New Oxford Dictionary of English, p. 378 (2001), filed in *Ericsson Inc. v. Intellectual Ventures II LLC*, Case. No. IPR2018-01666 (P.T.A.B.), Exhibit 2002, filed Dec. 27, 2018; 4 pages.

Patent Owner's Preliminary Response, filed in *Sprint Spectrum L.P. v. Intellectual Ventures II LLC*, Case. No. IPR2018-01777 (P.T.A.B.), Paper 7, filed Dec. 27, 2018; 35 pages.

Decision Denying Institution of *Inter Partes* Review, filed in *Sprint Spectrum L.P. v. Intellectual Ventures II LLC*, Case. No. IPR2018-01777 (P.T.A.B.), Paper 8, filed Mar. 25, 2019; 24 pages.

Andrew W. Davis, Modulation Schemes: Moving Digital Data With Analog Signals, EETimes (Oct. 4, 1997), filed in *Sprint Spectrum L.P. v. Intellectual Ventures II LLC*, Case. No. IPR2018-01777 (P.T.A.B.), Exhibit 2002, filed Dec. 27, 2018; 11 pages.

Technical Specification Group Radio Access Network, Physical Channels and mapping of Transport Channels Onto Physical Channels (TDD), 3GPP TS25.221 V7.0.0 (Mar. 2006), filed in *Sprint Spectrum L.P. v. Intellectual Ventures II LLC*, Case. No. IPR2018-01777 (P.T.A.B.), Exhibit 2003, filed Dec. 27, 2018; 139 pages.

Case Docket History as of Mar. 10, 2020, *Intellectual Ventures II LLC v. T-Mobile USA, Inc. f/k/a MetroPCS Communications, Inc. et al*, Case No. TXED-2-17-cv-00661; 15 pages.

Defendants' Notice of Narrowed List of Prior Art References [66], filed in *Intellectual Ventures II LLC v. T-Mobile USA, Inc. f/k/a MetroPCS Communications, Inc. et al*, Case No. TXED-2-17-cv-00661, filed May 7, 2019; 5 pages.

Intellectual Ventures II LLC's Rule 72 Objections to Order on Motion for Summary Judgment that the Asserted Claims of U.S. Pat. Nos. 9,532,330 and 8,682,357 are Patent Ineligible [79], filed in *Intellectual Ventures II LLC v. T-Mobile USA, Inc. f/k/a MetroPCS Communications, Inc. et al*, Case No. TXED-2-17-cv-00661, filed May 10, 2019; 10 pages.

Intellectual Ventures II LLC's Rule 72 Objections to Order on Motion for Summary Judgment that the Asserted Claims of U.S. Pat. Nos. 9,532,330 and 8,682,357 are Patent Ineligible [80], filed in *Intellectual Ventures II LLC v. T-Mobile USA, Inc. f/k/a MetroPCS Communications, Inc. et al*, Case No. TZED-2-17-cv-00661, filed May 10, 2019; 10 pages.

Case Docket History as of Mar. 10, 2020, filed in *Intellectual Ventures II LLC v. Sprint Spectrum LP d/b/a Sprint PCS et al.*, Case No. TZED-2-17-cv-00662; 60 pages.

(56) References Cited

OTHER PUBLICATIONS

Claim Construction Memorandum Opinion and Order [232], filed in *Intellectual Ventures II LLC* v. *Sprint Spectrum LP d/b/a Sprint PCS et al.*, Case No. TXED-2-17-cv-00662, filed Nov. 15, 2018; 36 pages.
Defendants' Rule 72 Objections to Claim Construction Order [245], filed in *Intellectual Ventures II LLC v. Sprint Spectrum LP d/b/a Sprint PCS et al.*, Case No. TXED-2-17-cv-00662, filed Nov. 30, 2018; 10 pages.
Markman Hearing Before the Honorable Roy S. Payne, United States Magistrate Judge [248], filed in *Intellectual Ventures II LLC v. Sprint Spectrum LP d/b/a Sprint PCS et al.*, Case No. TXED-2-17-cv-00662, filed Dec. 2, 2018; 62 pages.
Order [262], filed in *Intellectual Ventures II LLC* v. *Sprint Spectrum LP d/b/a Sprint PCS et al.*, Case No. TXED-2-17-cv-00662, filed Dec. 14, 2018; 1 page.
Motion for Partial Summary Judgment that Certain Disputed References are Prior Art [319], filed in *Intellectual Ventures II LLC* v. *Sprint Spectrum LP d/b/a Sprint PCS et al.*, Case No. TXED-2-17-cv-00662, filed Feb. 27, 2019; 15 pages.
Opposition to Intellectual Ventures II LLC's Motion to Strike References to Dr. Wilkinson's Affiliation with IPWireless [331], filed in *Intellectual Ventures II LLC* v. *Sprint Spectrum LP d/b/a Sprint PCS et al.*, Case No. TXED-2-17-cv-00662, filed Mar. 15, 2019; 15 pages.
Plaintiff Intellectual Ventures II LLC's Opposition to Defendant' Motion for Partial Summary Judgement that Certain Disputed References are Prior Art [350], filed in *Intellectual Ventures II LLC* v. *Sprint Spectrum LP d/b/a Sprint PCS et al.*, Case No. TXED-2-17-cv-00662, filed Mar. 20, 2019; 18 pages.
Plaintiff Intellectual Ventures II LLC's Opposition to T-Mobile and Sprint'Motion for Summary Judgement that the Asserted Claims of U.S. Pat. Nos. 9,320,018 and 9,681,466 are Patent-Ineligible [352], filed in *Intellectual Ventures II LLC* v. *Sprint Spectrum LP d/b/a Sprint PCS et al.*, Case No. TXED-2-17-cv-00662, filed Mar. 20, 2019; 22 pages.
Plaintiff Intellectual Ventures'Brief in Opposition to T-Mobile and Sprint's Motion for Summary Judgement on Patent-Ineligibility of the '330 and '357 Patents [353], filed in *Intellectual Ventures II LLC* v. *Sprint Spectrum LP d/b/a Sprint PCS et al.*, Case No. TXED-2-17-cv-00662, filed Mar. 20, 2019; 26 pages.
Intellectual Ventures II LLC's Reply Brief in Support of Motion to Strike References to Dr. Wilkinson's Affiliation with IPWireless [372], filed in *Intellectual Ventures II LLC v. Sprint Specturm LP d/b/a Sprint PCS et al.*, Case No. TXED-2-17-cv-00662, filed Mar. 26, 2019; 10 pages.
Reply in Support of Defendat' Prior Art Summary Judgment Motion [376], filed in *Intellectual Ventures II LLC* v. *Sprint Spectrum LP d/b/a Sprint PCS et al.*, Case No. TXED-2-17-cv-00662, filed Mar. 26, 2019; 10 pages.
T-Mobile and Sprint'Reply in Support of Their Motion for Summary Judfment that the Assorted Claims of U.S. Pat. Nos. 9,532,330 and 8,682,357 are Patent-Ineligible [379], filed in *Intellectual Ventures II LLC* v. *Sprint Specturm LP d/b/a Sprint PCS et al.*, Case No. TXED-2-17-cv-00662, filed Mar. 26, 2019; 11 pages.
T-Mobile and Sprint's Reply in Support of Their Motion for Summary Judgement that the Asserted Claims of U.S. Pat. Nos. 9,320,018 and 9,681,466 are Patent Ineligible [381], filed in *Intellectual Ventures II LLC* v. *Sprint Spectrum LP d/b/a Sprint PCS et al,*, Case No. TXED-2-17-cv-00662, filed Mar. 26, 2019; 10 pages.
Intellectual Ventures II LLC's Reply Brief in Support of Motion for Partial Summary Judgment on Defendants' Counterclaims and Affirmative Defenses [395], filed in *Intellectual Ventures II LLC* v. *Sprint Spectrum LP d/b/a Sprint PCS et al.*, Case No. TXED-2-17-cv-00662, filed Mar. 28, 2019; 30 pages.
Sur-Reply to IV's Motion to Preclude Expert Testimony on Certain Evidence in Support of Defendants' Written Description Defense [399], filed in *Intellectual Ventures II LLC* v. *Sprint Spectrum LP d/b/a Sprint PCS et al.*, Case No. TXED-2-17-cv-00662, filed Apr. 1, 2019; 9 pages.
Plaintiff Intellectual Ventures II LLC's Surreply in Opposition to Defendants' Prior Art Summary Judgment Motion [407], filed in *Intellectual Ventures II LLC* v. *Sprint Spectrum LP d/b/a Sprint PCS et al.*, Case No. TXED-2-17-cv-00662, filed Apr. 2, 2019; 6 pages.
Plaintiff Intellectual Ventures II LLC's Sur-Reply in Opposition to T-Mobile and Sprint's Motion for Summary Judgment that the Asserted Claims of U.S. Pat. No. 9,320,018 and 9,681,466 are Patent-Ineligible [413], filed in *Intellectual Ventures II LLC* v. *Sprint Spectrum LP d/b/a Sprint PCS et al.*, Case No. TXED-2-17-cv-00662, filed Apr. 4, 2019; 13 pages.
Intellectual Ventures II LLC's Sur-Reply in Opposition to T-Mobile and Sprint's Motion for Summary Judgment of Patent-Ineligibility of the '330 and '357 Patents [414], filed in *Intellectual Ventures II LLC* v. *Sprint Spectrum LP d/b/a Sprint PCS et al.*, Case No. TXED-2-17-cv-00662, filed Apr. 4, 2019; 13 pages.
Report and Recommendation [455], filed in *Intellectual Ventures II LLC* v. *Sprint Spectrum LP d/b/a Sprint PCS et al.*, Case No. TXED-2-17-cv-00662, filed Apr. 18, 2019; 14 pages.
Intellectual Ventures II LLC's Supplemental Brief to Preclude Expert Testimony on Certain Evidence in Support of Defendants' Written Description Defense [486], filed in *Intellectual Ventures II LLC* v. *Sprint Spectrum LP d/b/a Sprint PCS et al.*, Case No. TXED-2-17-cv-00662, filed Apr. 30, 2019; 13 pages.
Intellectual Ventures II LLC's Rule 72 Objections to Order on Motion for Summary Judgment that the Asserted Claims of U.S. Pat. No. 9,532,330 and 8,682,357 are Patent Ineligible [541], filed in *Intellectual Ventures II LLC* v. *Sprint Spectrum LP d/b/a Sprint PCS et al.*, Case No. TXED-2-17-cv-00662, filed May 10, 2019; 10 pages.
Intellectual Ventures II LLC's Rule 72 Objections to Order on Motion for Summary Judgment that the Asserted Claims of U.S. Pat. No. 9,532,330 and 8,682,357 are Patent Ineligible [542], filed in *Intellectual Ventures II LLC* v. *Sprint Spectrum LP d/b/a Sprint PCS et al.*, Case No. TXED-2-17-cv-00662, filed May 10, 2019; 10 pages.

\* cited by examiner

PAGING IN A WIRELESS NETWORK

CROSS REFERENCE TO RELATED APPLICATION(S)

This application is a continuation of U.S. patent application Ser. No. 15/385,120, filed Dec. 20, 2016, which is a continuation of U.S. patent application Ser. No. 14/222,140, filed Mar. 21, 2014, which issued as U.S. Pat. No. 9,532,330 on Dec. 27, 2016, which is a continuation of U.S. patent application Ser. No. 11/416,865, filed May 2, 2006, which issued as U.S. Pat. No. 8,682,357 on Mar. 25, 2014, which are incorporated by reference as if fully set forth.

BACKGROUND OF THE INVENTION

Field of the Invention

The invention generally relates to wireless communication systems, and more particularly, to establishing connectivity in a cellular communication system.

Description of the Related Art

Wireless communication systems support a sleep mode to minimize battery power consumption of user equipment (UE), such as a mobile terminal. In sleep mode, the mobile terminal performs little or no activity, and does not transmit/receive traffic data. Therefore, the mobile terminal in sleep mode only consumes a small amount of radio link resources, if any. Consequently, a large number of users can simultaneously be supported in the system.

A mobile terminal can terminate sleep mode and connect to a Radio Access Network (RAN) of base stations (otherwise known as "Node B"s according to the 3GPP protocol) in two ways. If traffic needs to be transmitted from the mobile terminal, the mobile terminal may terminate the sleep mode by requesting a connection to the network. This is denoted a "mobile terminal initiated (originated) connection." Otherwise, the network may request the mobile terminal to make a connection to the network. This is denoted a "network-initiated connection". The procedure used for waking up the mobile terminal from the sleep mode in "network-initiated connection" employs paging.

Paging involves waking up the mobile terminal from the sleep state. After waking up, the mobile terminal reads the paging message(s) transmitted in a downlink paging channel(s). The mobile terminal either connects to the network or performs the task instructed by the network via the paging message(s).

Depending on the amount of activity and connectivity involved, the sleep mode can be categorized into two sub-modes as "idle (standby)" and "dormant". In idle mode, the mobile terminal has no connection to the RAN; however, it is connected to the core network. In contrast, in the dormant state the mobile terminal is connected to the RAN. In order to assist mobility in sleep mode, the mobile terminal is registered in a registration area or "paging zone". The mobile terminal informs the network of its location and status in the registration process. This enables efficient paging in case of network-initiated connection establishment. A registration area may be defined as a zone (e.g., one or more cells) respectively controlled by a base station (or Node-B) or a plurality of base stations (or Node-Bs). A registration area may be also be known as a "routing area", "tracking area", "location area", or, for Universal Mobile Telecommunications Systems (UMTS) implementing 3G wireless communications, "UTRAN registration area (URA)".

The mobile terminal performs a registration whenever the "registration area" is changed. In other words, whenever the cell the mobile terminal is camped on broadcasts a "registration area" identity which is different from the registration area that the mobile terminal previously registered, then the mobile terminal should perform a registration update. Here, it is assumed each cell broadcasts only one "registration area" identity. However, the registration area may be defined to include overlapping zones. In that case, the cell would broadcast multiple registration area IDs.

In the conventional paging procedure, two signals are used to convey the paging message. The first paging signal is used to indicate whether a paging message is being transmitted to a particular UE or group of UEs. The second paging signal carries the paging message(s) for the particular UE or group of UEs. The second paging signal is transmitted following the first paging signal at a fixed time offset from the first paging signal.

The mobile terminal uses Discontinuous Reception (DRX) in sleep mode in order to reduce power consumption. When DRX is used, the mobile terminal needs to monitor the first paging signal only at one paging occasion per DRX cycle. The length of the DRX cycle is core network domain specific and may be updated locally in the mobile terminal using information given in system information from the core network.

The core network usually knows when the mobile terminal will be monitoring the first paging signal within DRX cycle. Thus, if the network intends to page a particular mobile terminal, it sends the first paging signal at the time when the mobile terminal will monitor the paging channel. If the mobile terminal does not receive any paging in the first paging signal, it goes back to the sleep mode. Otherwise, the mobile terminal reads the second paging signal.

The network may page the mobile terminal to establish a network originated call or to trigger reading of updated system information. In response to the paging message, the mobile may establish a connection with the RAN (if the mobile terminal is in an "idle" state), or update the mobile terminal location using a cell update procedure (if the mobile terminal is in a "dormant" state).

Upon receipt of the paging response, the RAN knows the location of the mobile terminal at the cell level. Thus, the radio resources can efficiently be allocated to the mobile terminal for the call.

In the conventional system, the connection establishment and cell update response to a paging message (network-initiated connection) follow the same procedures as when the connection establishment/cell update is performed in response to a "terminal initiated connection". In the latter case, the establishment cause is not known to the network until a connection request message is received by the mobile terminal. Therefore, the network can manage the connection setup only after receiving the initial connection request from the mobile terminal.

BRIEF SUMMARY OF THE INVENTION

In the case of a network-initiated connection, before the network pages the mobile terminal it knows the cause for connection establishment, and also the terminal context, to some extent, because the terminal is connected to the core network even when it is in the idle state. Therefore, the information known at the network may be used to optimize (speed up) connection establishment between the mobile terminal and the RAN.

Embodiments of the present invention provide a network-initiated connection establishment procedure which uses the information known at the network to speed up the connection between the mobile terminal and RAN. The invention uses a paging procedure to inform the mobile terminal of a network-initiated connection. The paging message is designed to support fast connection establishment over a shared channel.

Embodiments of the present invention provide a method of establishing a network-initiated connection between a mobile terminal User Equipment (UE) and a Radio Access Network (RAN) in which (1) the network (e.g., an aGW) initiates the connection by transmitting a paging message to the Node Bs in the UE registered tracking area, and (2) the Node Bs (belonging to the tracking area) receive the paging message and affix the paging message with a cell-specific radio network temporary identity (c-RNTI) and index(es) to one or a set of shared control channels (SCCHs). The c-RNTI and SCCHs are selected from the available c-RNTIs and SCCHs for the cell. The selection of c-RNTI and SCCH may be managed by the scheduler at the Node B, the core network (e.g., the aGW), or a separate radio resource manager (RRM) server.

The complete message is broadcast in the cell. The recipient UE may use the c-RNTI as a temporary cell-specific identity, and the SCCH as the associated shared control channel for shared channel operation. If the message is intended for the UE then it sends a paging acknowledgement message in the uplink. The message may be sent over a contention-based uplink channel (e.g. RACH) or a dedicated physical channel.

Upon the network's receipt of the paging acknowledgment from the UE, a shared channel connection is established between the UE and the network. After establishment of the shared channel connection, signalling and traffic data is transmitted over scheduled shared channel resources.

The paging message may be conveyed to the UE using: (1) paging indicators mapped onto a paging indicator channel (PICH), and the paging message mapped onto separate paging channels (PCH), (2) paging indicators mapped onto a shared control channel (SCCH) and the paging message mapped onto separate paging channels (PCH); or (3) paging indicators mapped onto a shared control channel (SCCH) and the paging message mapped onto a downlink shared transport channel (SCH).

The paging acknowledgment message may be transmitted along with an uplink (UL) synchronization message over a contention-based random access channel, or as a separate paging acknowledgment message over such a channel.

The selection of c-RNTI and SCCH (to be attached to the paging message) may be managed by the Node B. The Node B selects an unused c-RNTI and one or a set of SCCHs, and signals these to the UE with the paging message. The paging message broadcast in different cells may have different c-RNTIs and SCCHs.

Alternatively, the selection of c-RNTI and SCCH may be managed by the aGW or a separate RRM server, in which case the c-RNTI and SCCH may be selected as cell-specific so that each Node B sends a paging message using different c-RNTIs and SCCHs. The c-RNTI and SCCH may alternatively be tracking-area specific, so that each Node B in the tracking area sends paging messages including the same c-RNTI and SCCH.

BRIEF DESCRIPTION OF THE DRAWING(S)

DETAILED DESCRIPTION OF THE INVENTION

Embodiments of the invention enable the RAN to perform network-initiated (originated) connection establishment over shared transport channels (SCHs). The SCHs are associated with a set of physical Shared Control Channels (SCCHs). Specific information required by the UE for correct transmission/reception over the SCHs is conveyed from RAN to UE over the SCCHs. For downlink, this information may specify the resources to be used for the downlink transmission, and information regarding the formatting of the data to enable its correct reception at the UE. For the uplink, the information might again specify which transmission resources are to be used along with other shared channel grant information (power allocation, etc.). In both cases, the terminal to which the shared channel grant is directed is identified on the shared channel based on a RAN (or cell) Specific Temporary Identification (c-RNTI), which is signalled to the UE by the RAN within the SCCH itself.

Figure 1:
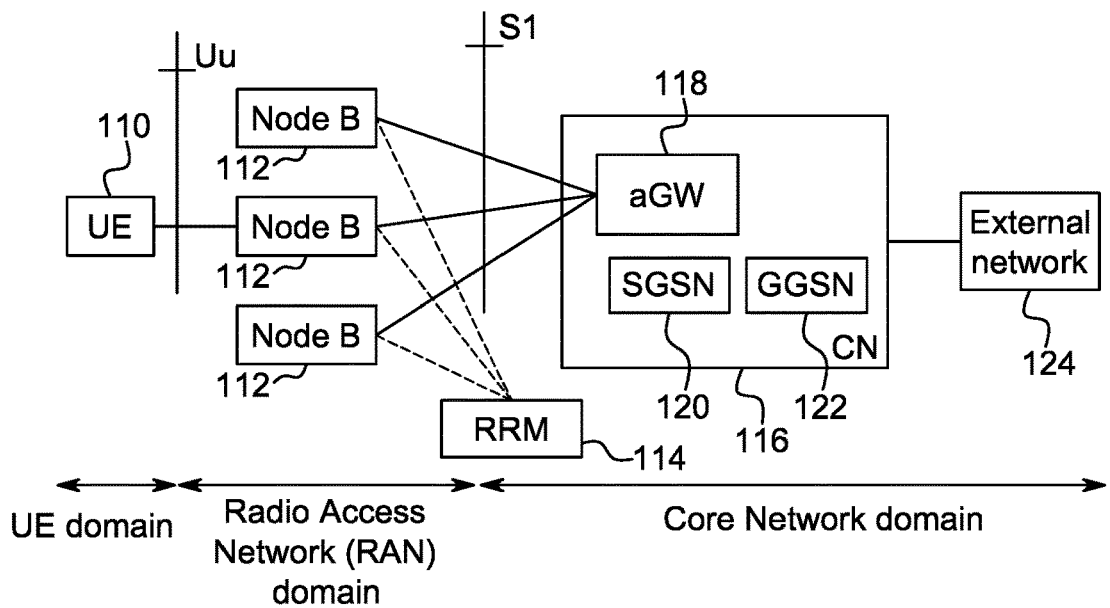
FIG. 1 illustrates an example of a cellular communication system according to embodiments of the invention.

FIG. 1 illustrates an example of a cellular communication system according to embodiments of the invention. The network includes a user equipment (UE) domain, a radio access network (RAN) domain, and a core network domain. The UE domain includes user equipment 110 that communicate with at least one base station 112 in the RAN domain via a wireless interface. The RAN domain may also include a network controller (e.g., radio network controller) (not shown), such as that used in UMTS systems. Alternatively, such functionality may be distributed between the Node Bs and the aGW or other controller in the core network. FIG. 1 also illustrates an optional radio resource manager (RRM) 114. As described below, the RRM may perform functions otherwise performed by the Node Bs or aGW in some embodiments.

The core network (CN) 116 includes, in this example, an access gateway (aGW) 118, a serving GPRS support node (SGSN) 120, and a gateway GPRS support node (GGSN) 122. The core network is coupled to an external network 124. The SGSN 120 is responsible for session control, including keeping track of the location of the UEs. The GGSN 122 concentrates and tunnels user data within the core network 116 to the ultimate destination (e.g., an Internet service provider) in the external network 124. Further details may be found in the 3GPP UMTS technical specifications, such as TS 23.246 v6.4.0 "3rd Generation Partnership Project; Technical Specification Group Services and System Aspects; Multimedia Broadcast/Multicast Service (MBMS); Architecture and Functional Description (Release 6)," published by the 3GPP Support Office, 650 Route des Lucioles—Sophia Antipolis, Valbonne—FRANCE, which are incorporated by reference herein.

Figure 2:
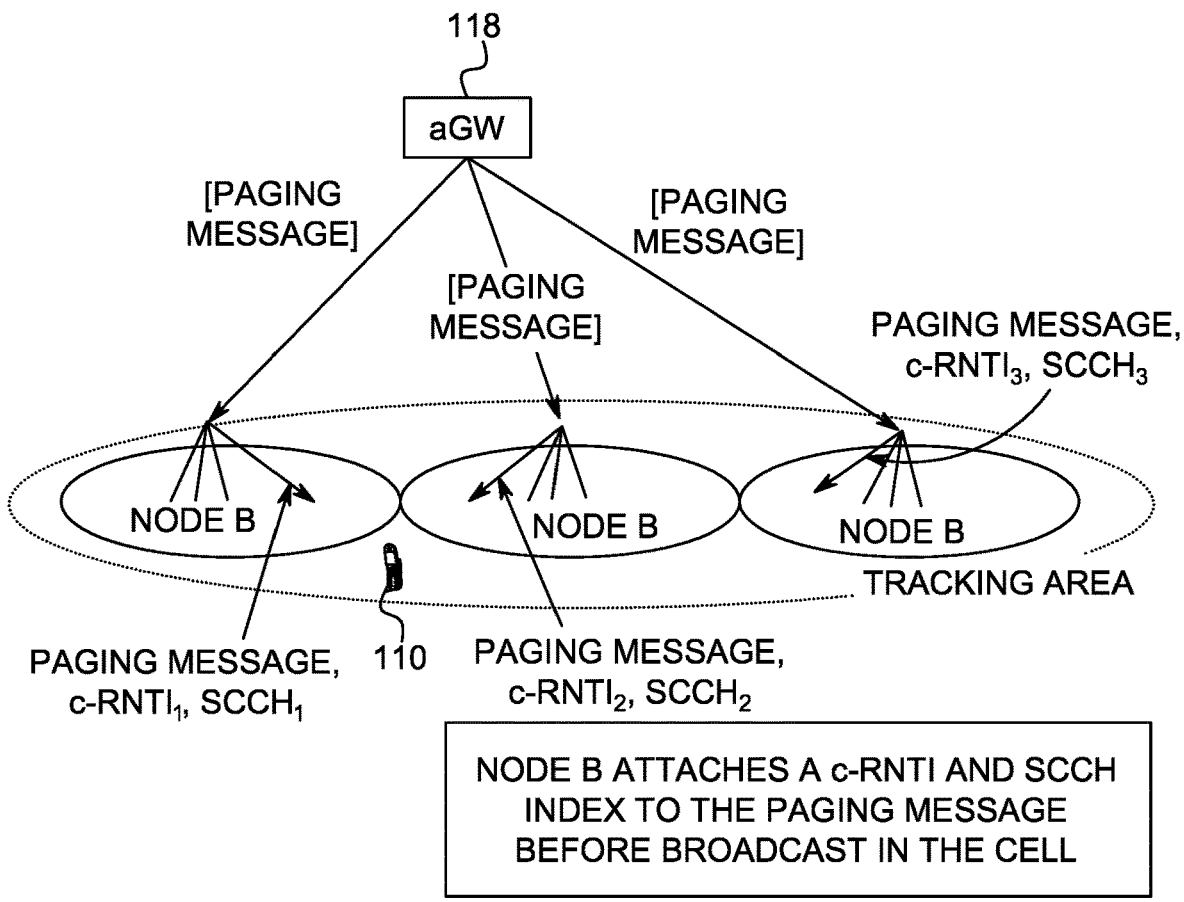
FIG. 2 illustrates network-initiated connection establishment according to embodiments of the invention.

FIG. 2 illustrates network-initiated connection establishment according to embodiments of the invention. A network controller (e.g., an access gateway 118 in a core network) sends a paging message to the Node Bs 112 in the registration area to be broadcast in the cells. Before the paging message is broadcast in each cell, the Node B attaches a c-RNTI and SCCH index to the message. The c-RNTI and SCCH is selected from the available c-RNTIs and SCCHs in the cell and may, in some embodiments, be managed by a scheduler at the Node B. The corresponding UE 110 (the UE to which paging is indicated) uses this c-RNTI and SCCH index for data transmission over shared channels.

Figure 3:
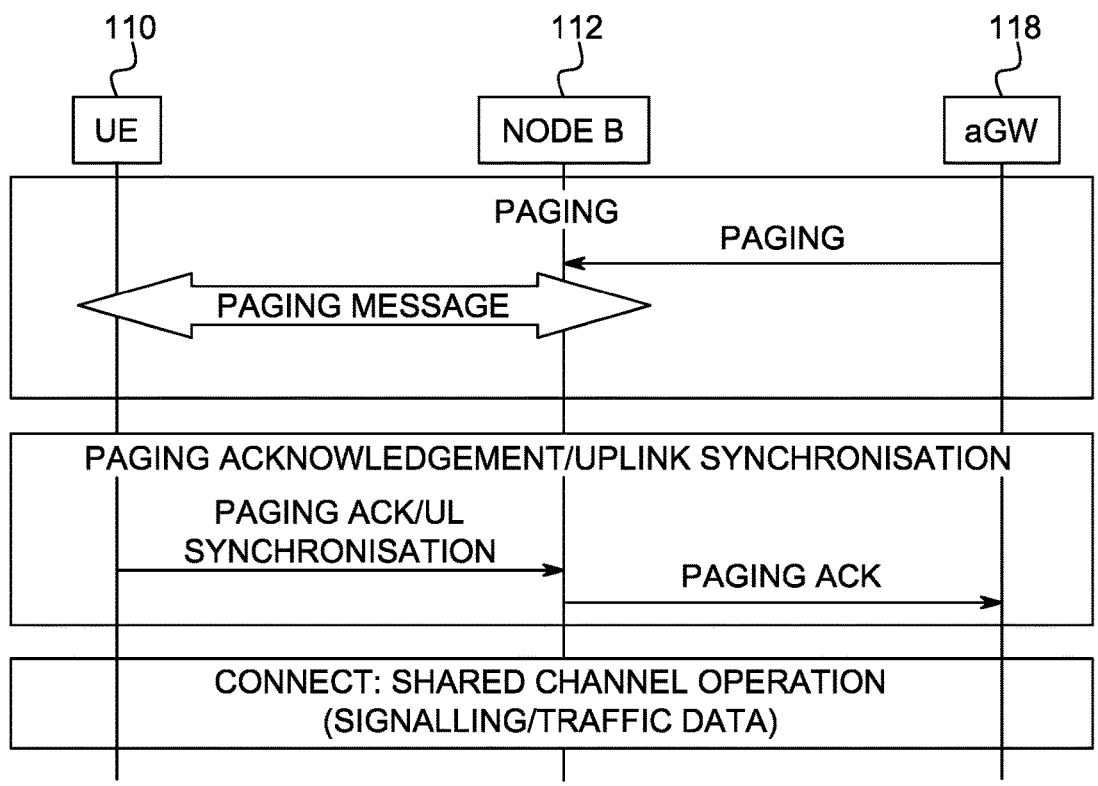
FIG. 3 illustrates an example of signaling flow according to embodiments of the invention.
Figure 4:
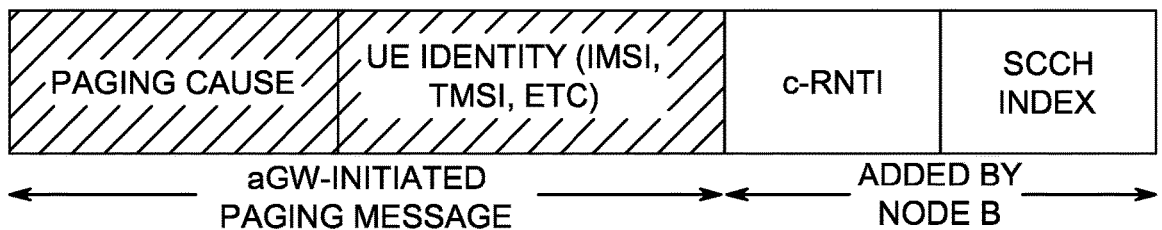
FIG. 4 illustrates the format of a paging signal broadcast in a cell according to embodiments of the invention.

FIG. 3 illustrates an example of signaling flow in an embodiment of the network-initiated connection establishment procedure. The network sends a paging message to the UE 110 via the Node Bs 112 to initiate a connection. First, the core network (or, more particularly in some embodiments, access gateway 118 within the core network) transmits the paging message to the relevant Node Bs in the registration area. After receiving the paging message from the core network, each Node B selects a c-RNTI and SCCH index (in one embodiment), and forms the paging signal to be broadcast in the corresponding cell. Thus the paging signal broadcast in the cell includes the paging message (cause, UE identity) from the core network, c-RNTI and the SCCH index (see FIG. 4). The UE identity may be expressed by the international mobile subscriber identity (IMSI) or temporary mobile subscriber identity (TMSI), which are known in the 3G standard. The recipient UE may use this c-RNTI as the cell-specific identity and the SCCH as the associated shared control channel for the shared channel operation.

After decoding the paging message, the UE sends a paging acknowledgement message to the Node Bs in the RAN. The message may be combined with uplink synchronisation information and transmitted over a contention-based uplink channel (such as a random access channel (RACH)).

Figure 5:
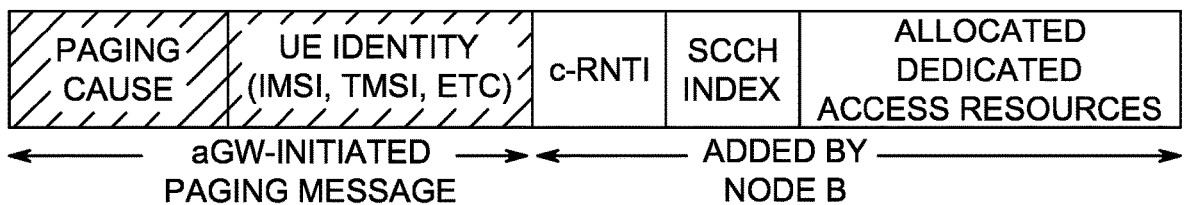
FIG. 5 illustrates the format of a paging signal broadcast in a cell according to embodiments of the invention where dedicated access resources are signalled to the UE.

Due to possible UE collision on the contention-based uplink channel, the paging acknowledgement message may experience some delay. This can be avoided by allocating dedicated physical access resources for the transmission of the paging response message. If this is used, then the allocated physical access resources for the uplink transmission (paging response) may be signalled to the UE together with the paging message. Thus the paging signal may take the format shown in FIG. 5.

Figure 6:
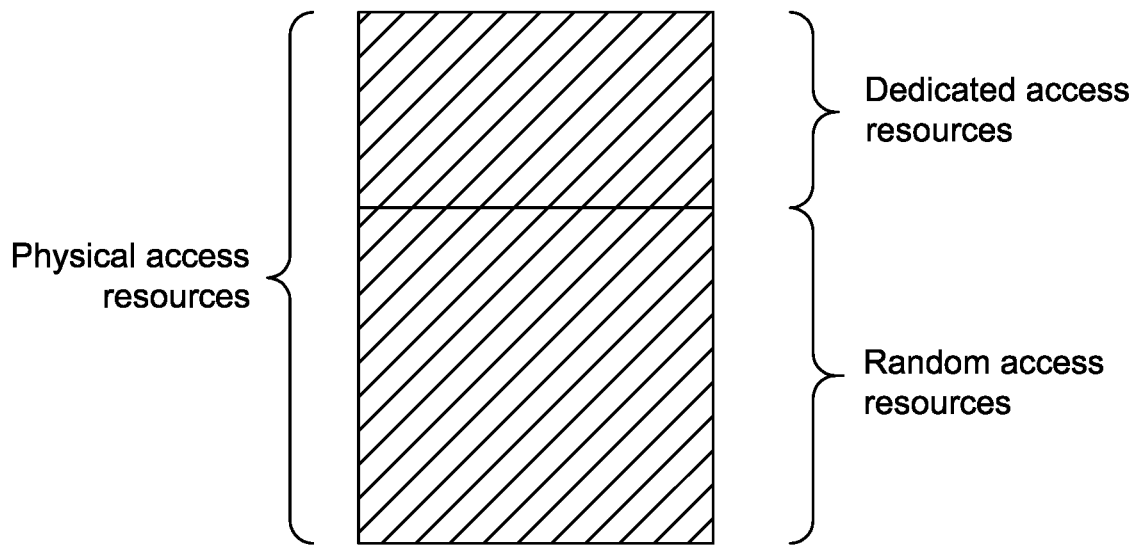
FIG. 6 illustrates resources available for allocation according to embodiments of the invention.

The dedicated access resources may be a subset of resources allocated for access channels (see FIG. 6). However, these resources may be reserved for allocation by the network, in contrast to selection by the UE in a normal contention-based RACH operation. The same message format is used for both the RACH channel and the dedicated access channel. The information on random access resources (RACH channels) is broadcast over a broadcast control channel (BCCH), whereas the channel information for the dedicated access channels is not broadcast in the cell. This information is transmitted to the UE together with the paging signal according to one embodiment of the invention.

Upon receipt of the paging acknowledgment from the UE, a shared channel connection is established between the RAN and the UE, and signalling and traffic data will be transmitted over scheduled shared channel resources.

Mapping of Paging Message

Figure 7:
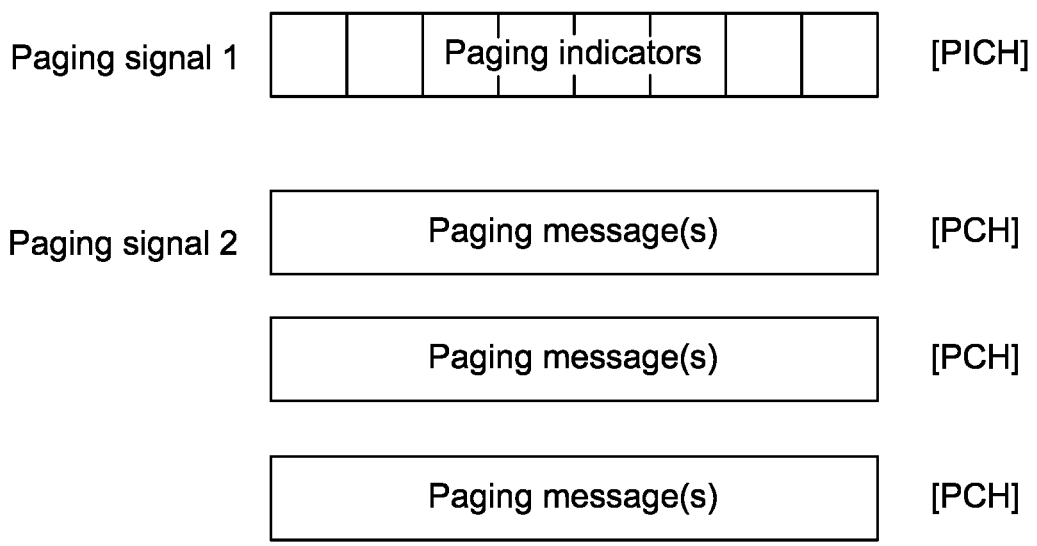
FIGS. 7-9 illustrate three different ways in which a paging message may be mapped according to embodiments of the invention.
Figure 8:
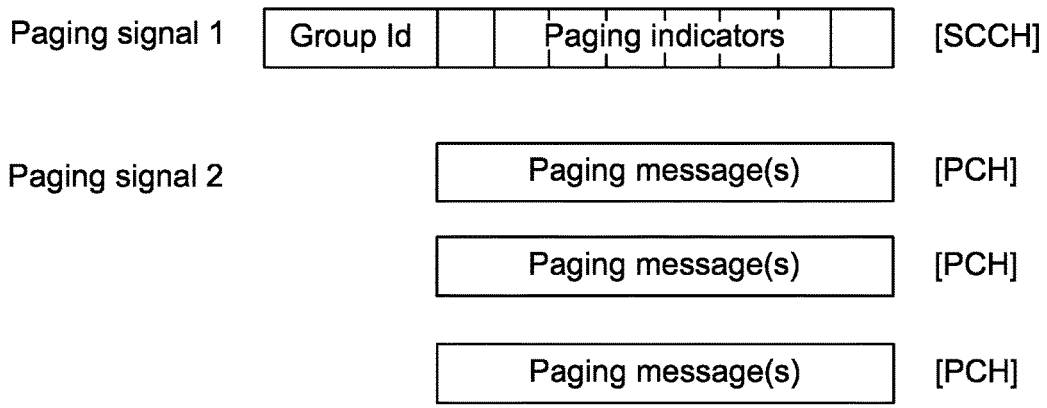
Figure 9:
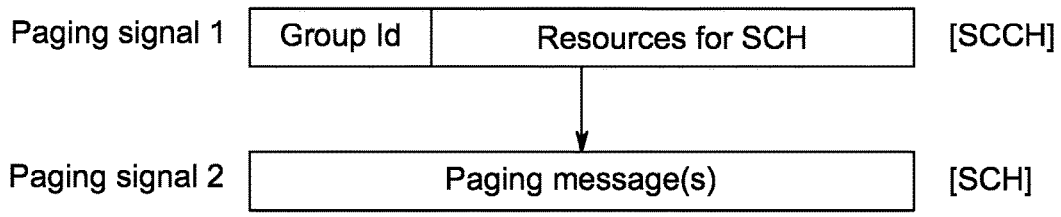

In some embodiments, two-stage paging is employed. Referring to FIGS. 7-9, paging signal 1 wakes up a group of UEs to read the paging message(s), which are transmitted in paging signal 2. Three different implementations of two-stage paging are described herein.

Implementation 1

A paging signal 1 is mapped onto a separate physical channel, such as a paging indicator channel (PICH). A group of UEs wake up and read the PICH channel at a paging occasion calculated based on the DRX cycle and IMSI (used herein as an example of a UE identifier known by the core network). If a paging indicator is set to true, the UEs corresponding to the paging indicator read the paging message transmitted in paging signal 2.

The paging signal 2 may be mapped to separate paging channels (PCH). From the IMSI, the UE may calculate which paging channel to read, and read the paging message within the paging channel carrying the UE's IMSI. The system may use one PICH and a set of PCHs to enable paging for multiple UEs at a given paging occasion (see FIG. 7).

Implementation 2

In another embodiment, the paging signal 1 may be mapped onto SCCH. In this case a group ID or an ID specified for paging (paging ID) can be used in an ID field of SCCH. The paging indicators may be mapped to an SCCH information field (FIG. 8). Note that the channel format of SCCH (used for paging signal 1) is different from that used in the "normal" shared channel operation.

The paging signal 2 is transmitted over the paging channel (PCH). In this case, the UEs wake up from sleep mode as defined by the DRX cycle and IMSI, and read the SCCH for paging indicators. The location of a paging indicator within a paging signal 1 may be calculated based on the IMSI. If only one SCCH is used for paging indicators, a predefined paging ID may be used to inform the UE that paging signal 1 is a paging indicator-specific message. Otherwise, several SCCH may be used.

The UE corresponding to the same paging occasion may be assigned to a group, and each group is assigned a group ID. The user group ID may be located in the identity field in SCCH. The UEs belonging to the user group defined by the user group ID read the SCCH corresponding to the UEs' user group for their paging indicators. If the corresponding paging indicator is set to true, then the UE reads the paging signal 2, which is transmitted over the PCH and defined by the UE's IMSI. From the IMSI, the UE calculates which paging channel to read, and reads the paging message within the paging channel carrying the UE's IMSI. The system may use one or a set of SCCHs and one or a set of PCHs to enable paging for multiple UEs at a given paging occasion.

Implementation 3

This implementation uses SCCH and SCH to transmit paging signals. In addition, the same channel format as used in the normal shared channel operation is employed. Each UE learns which SCCH to monitor based upon either system information broadcast to the UEs, or because the SCCH index is preprogrammed in the UE pursuant to the applicable standard. The UEs listen to the appropriate SCCH for paging indicators at their paging occasion calculated based on DRX cycle and IMSI. The UEs with the same paging occasion are divided into groups based on the IMSI. Each group is given a user group ID, as indicated in the SCCH ID field. The message part of SCCH indicates the resources allocated for a corresponding SCH channel, which carries the paging message(s) (paging signal 2). If the UE belongs to the user group indicated in the SCCH ID field, the UE reads the allocated SCH for its paging message. An example implementation is shown in FIG. 9. The system may use a set of SCCHs/SCHs to enable paging for multiple UEs at a given paging occasion.

Paging Acknowledgement/UL Synchronisation

After receiving the paging message from the network, the UE sends a paging acknowledgment message in the uplink (UL). The message may be sent over a contention-based channel (such as a random access channel (RACH)) or an allocated, dedicated access channel.

Figure 10:
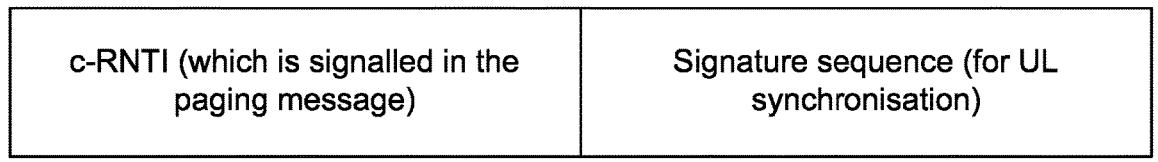
FIG. 10 illustrates the format of a paging acknowledgement including uplink synchronization according to embodiments of the invention.

The paging acknowledgement may be sent separately or combined with a UL synchronisation request message. If the paging acknowledgment is combined with the UL synchronisation request message, the message may contain c-RNTI, which is signalled in the paging message, and a signature sequence which is selected from a set of sequences broadcast in a broadcast channel (BCH), or specified in the applicable communication standard specification (to be used for UL synchronisation), which may be programmed into the UE. The message format is shown in FIG. 10.

In another embodiment, the UE may send the paging acknowledgment and UL synchronisation in separate messages, in which case the paging acknowledgment message only contains the c-RNTI value signalled in the paging message. This may be sent over RACH or over an allocated, dedicated access channel.

After receiving the paging acknowledgment from the UE, the Node B knows the UE location at the cell level. The Node B then establishes a radio connection between the UE and the Node B over a shared channel. The UE uses the c-RNTI and the SCCH index, which are signalled with the paging message to identify the UE and the SCCH, respectively, during shared channel operations. The Node B conveys the paging acknowledgment from the UE to the Core network. This completes the connection between the UE and the network.

SCCH and c-RNTI Management

One way to manage the allocation of c-RNTI and SCCH is to allow the Node Bs to select c-RNTIs and SCCHs. After receiving a paging request from the aGW, the Node B may select an unused c-RNTI and one or a set of SCCHs to be used by the UE, if, e.g., the UE is in the idle state. During idle mode, the UE is not connected to a Node B, but is connected to the core network. The UE is known by its UE identifier (e.g., IMSI or TMSI) at the core network. In some embodiments, the Node B provides a temporary ID to the UE to connect the UE and the base station. After the Node B receives a paging acknowledgement from the UE, the Node B sends the paging acknowledgement to the core network to complete the binding, enabling the core network to know that the UE is within the coverage area of the Node B.

Figure 11:
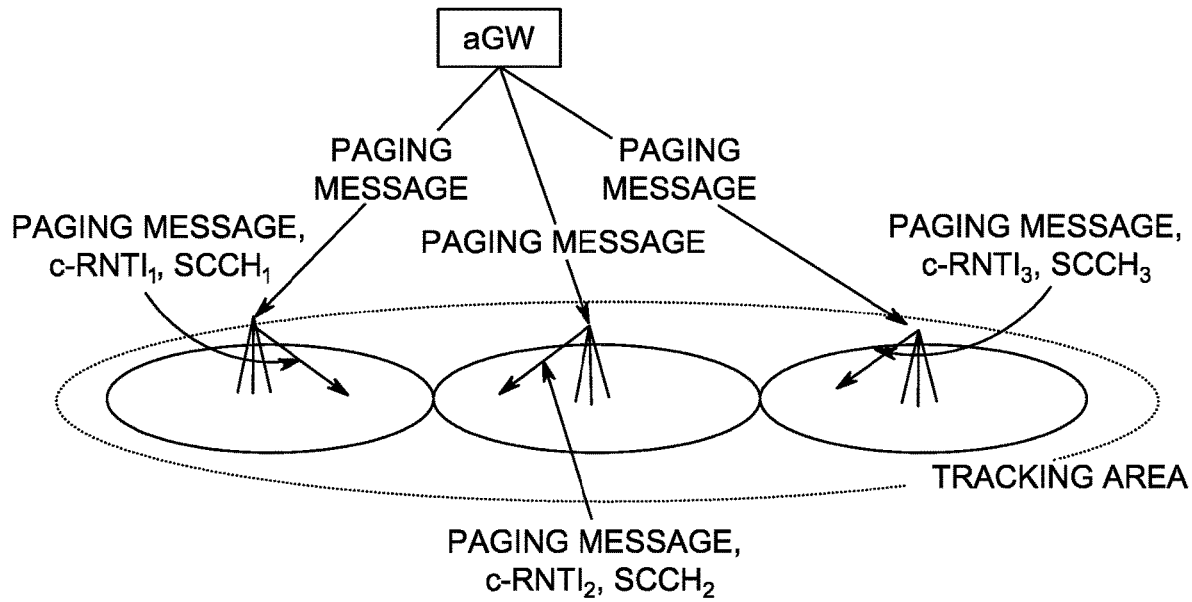
FIG. 11 illustrates the paging messages broadcast in different cells having different c-RNTIs and SCCHs, according to embodiments of the invention.

If the paged UE has already been assigned a c-RNTI and a set of SCCHs by the Node B (e.g., the case when the UE is in dormant state), the previously assigned c-RNTI and SCCHs may be used within the paging signal by the Node B. This results in the paging messages broadcast in different cells having different c-RNTIs and SCCHs, as shown in FIG. 11.

Figure 12:
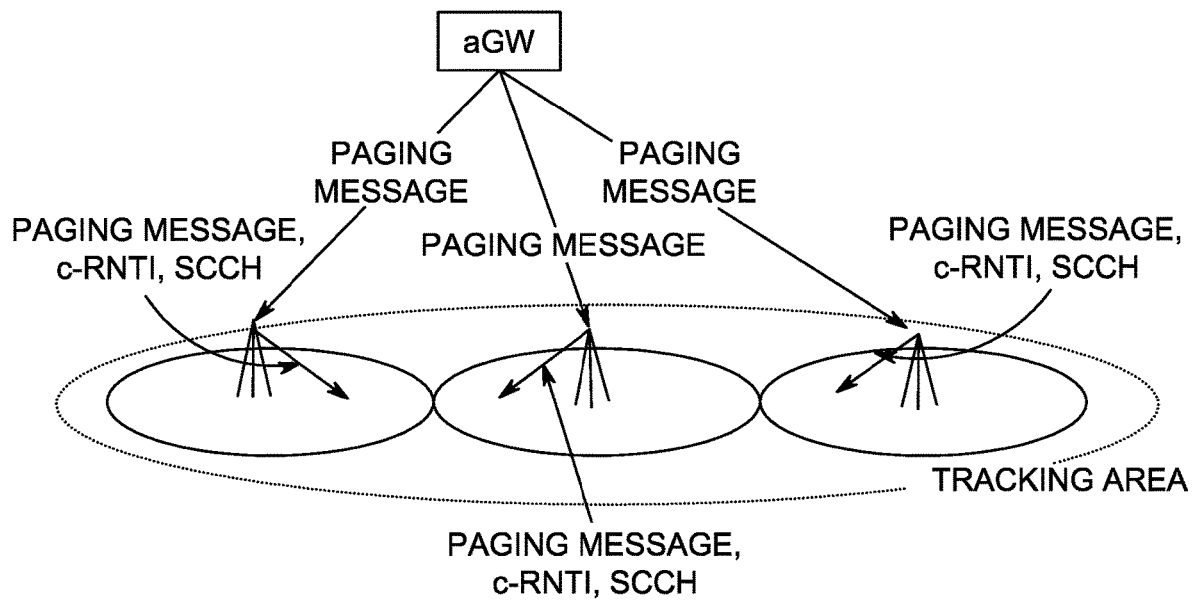
FIG. 12 illustrates the paging messages broadcast in different cell having the same c-RNTI and SCCH in all cells within a tracking area, according to embodiments of the invention.

Alternatively, the c-RNTI and SCCH may be managed/selected by the aGW in the core network or a separate RRM server. C-RNTI and SCCH may be selected as cell-specific, in which case each Node B sends a paging message including different c-RNTIs and SCCHs affixed to the same initial paging message from the core network or RRM. Alternatively, the paging message may be sent including the same c-RNTI and SCCH in all cells within a tracking area (FIG. 12). In that case, the aGW or RRM may reserve a set of c-RNTIs and SCCHs for use in paging requests.

When the RRM is employed, it takes over the function of assigning c-RNTI and SCCHs. (The aGW, in one embodiment, still sends the paging message.) The RRM server reserves a set of temporary identifiers and SCCHs. The RRM selects, allocates and keeps track of the assignment of temporary identifiers and SCCHs to paging messages. The RRM does not need to know the UE identifier (e.g., IMSI or TMSI).

Network-initiated connection establishment may vary depending on the UE connection states (e.g., idle or dormant states) and the paging cause.

Paging for Idle State UEs

Idle state UEs are not known at the cell level because they are generally not connected to the RAN. Therefore, the UE would not have a c-RNTI or SCCH specified for its use in shared channel operation. However, the level of connection to the network may have two definitions. In one definition, the UE has no connection to the RAN, but it is connected to the core network. The network does not store UE capability or security information regarding Idle mode UEs (this is the definition used for idle mode in conventional systems).

According to the second definition of the idle state, the UE is connected to the core network and has limited connection to the RAN. With this limited connection, however, the UE does not have c-RNTI, SCCH or radio resources allocated. Nevertheless, the UE is registered within the network, in which case the network would have a UE context (such as UE capabilities) stored in the network. Also, the security mode control and authentication procedures have been performed during the UE registration, and the security keys (ciphering, integrity protection) may have been exchanged between the network and the UE. The security keys would be stored in the UE and the network. (This is a possible definition of the idle state that may be used in LTE, i.e., the "long-term evolution" or next generation of the communications standard after UMTS.)

According to the two definitions for idle mode, two alternative network-initiated connection establishment procedures may be implemented.

Figure 13:
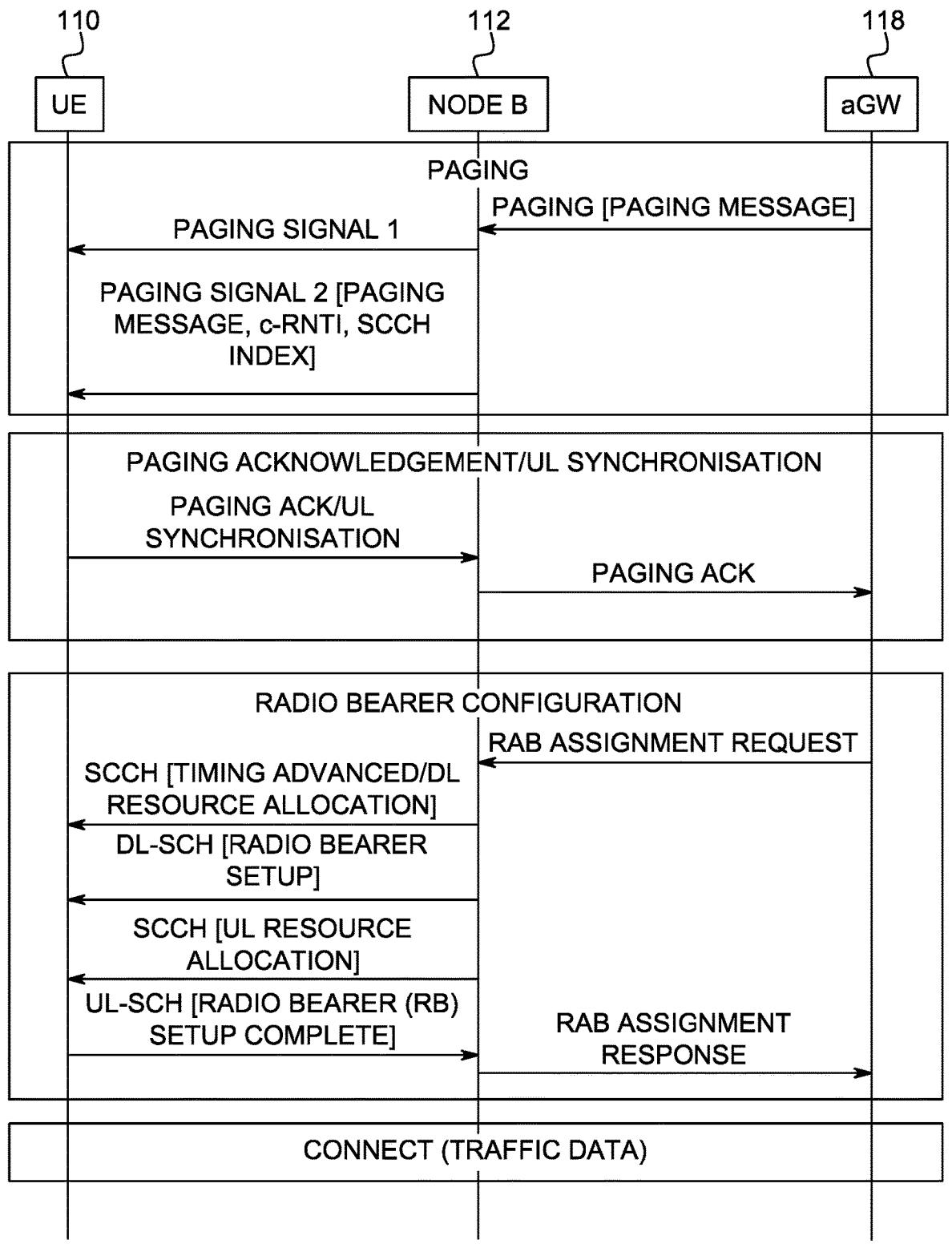
FIG. 13 illustrates signalling flow in idle mode according to embodiments of the invention.

FIG. 13 depicts the signalling flow involved in network-initiated connection establishment in the case for an Idle mode UE with limited connection to the RAN (possible Idle state definition in LTE).

The paging message indicates with a UE identifier, such as IMSI, which UE has been paged. The paging message may be ciphered and sent (from aGW or other core network element) transparent to the Node B. Paging is broadcast in the cell (by Node Bs) according to the paging procedure described with respect to FIG. 3. After receiving the paging message, the UE sends a paging acknowledgment (with or without UL synchronisation request). The Node B conveys the paging acknowledgment to the aGW. Note that security control or authentication is not necessary as the authentication has already been performed and the security information is stored in the aGW.

When the paging acknowledgment is received by the network, the connection is established between the UE and the network for shared channel operation. The c-RNTI and SCCH index signalled with the paging message is used by the UE as the shared channel IDs.

After sending the paging acknowledgment message, the UE listens to the allocated SCCH (which is signalled with the paging message) for resource allocation on SCH. The aGW issues a Radio Access Bearer (RAB) assignment request to the Node B. The Node B assigns radio resources for the message transmission, and the UE is informed about the allocated resources over SCCH. The timing advance information calculated at the Node B for uplink time synchronisation may also be mapped on to the SCCH. The timing advance information may alternatively be conveyed using a separate physical channel. [Node B computes propagation delay and signals back timing advance information to UE, so that signals from all UEs will be time synchronized at the Node B.]

The Node B sends a radio bearer setup message using the allocated physical resources on DL-SCH (downlink shared channel). The radio bearer setup complete message is sent on UL-SCH (uplink shared channel). Upon receipt of RAB assignment response by the aGW, the data transmission is commenced over the shared channel.

The radio bearer setup/response message may be sent using a logical dedicated control channel (DCCH) mapped onto a shared transport channel (SCH). In that case, a default bearer configuration is used for the message (radio bearer setup/response message) transmission.

In some embodiments, the system may employ a default (or stored) radio bearer configuration (or some part of that configuration) for the data transmission. In this case, the use of default (or stored) configuration information may be signalled within the paging message. If so, only the additional information needed in the case of a radio bearer re-configuration needs to be communicated between the RAN and UE before the data transmission is commenced.

If no UE security or authentication information is kept in the network in the idle state, the security control and authentication may be performed before the radio bearer configuration step. The security control may also be performed over SCH using the allocated c-RNTI as the UE identification over SCH. The resource allocation is communicated over the allocated SCCH.

Paging for Dormant State UEs

In the dormant state, the UE is connected to the network. Thus, it is given a c-RNTI from the Node B with which the UE was last registered. The UE may have gone out of the coverage area of the Node B. Thus the UE is paged in the cells (Node Bs) belonging to the tracking area.

The paging for dormant state UEs is similar to that for idle state UEs described above. However, as the UE has already allocated a c-RNTI, the same c-RNTI may be used with the paging message when the UE is paged in the cell with which it was last registered.

Figure 14:
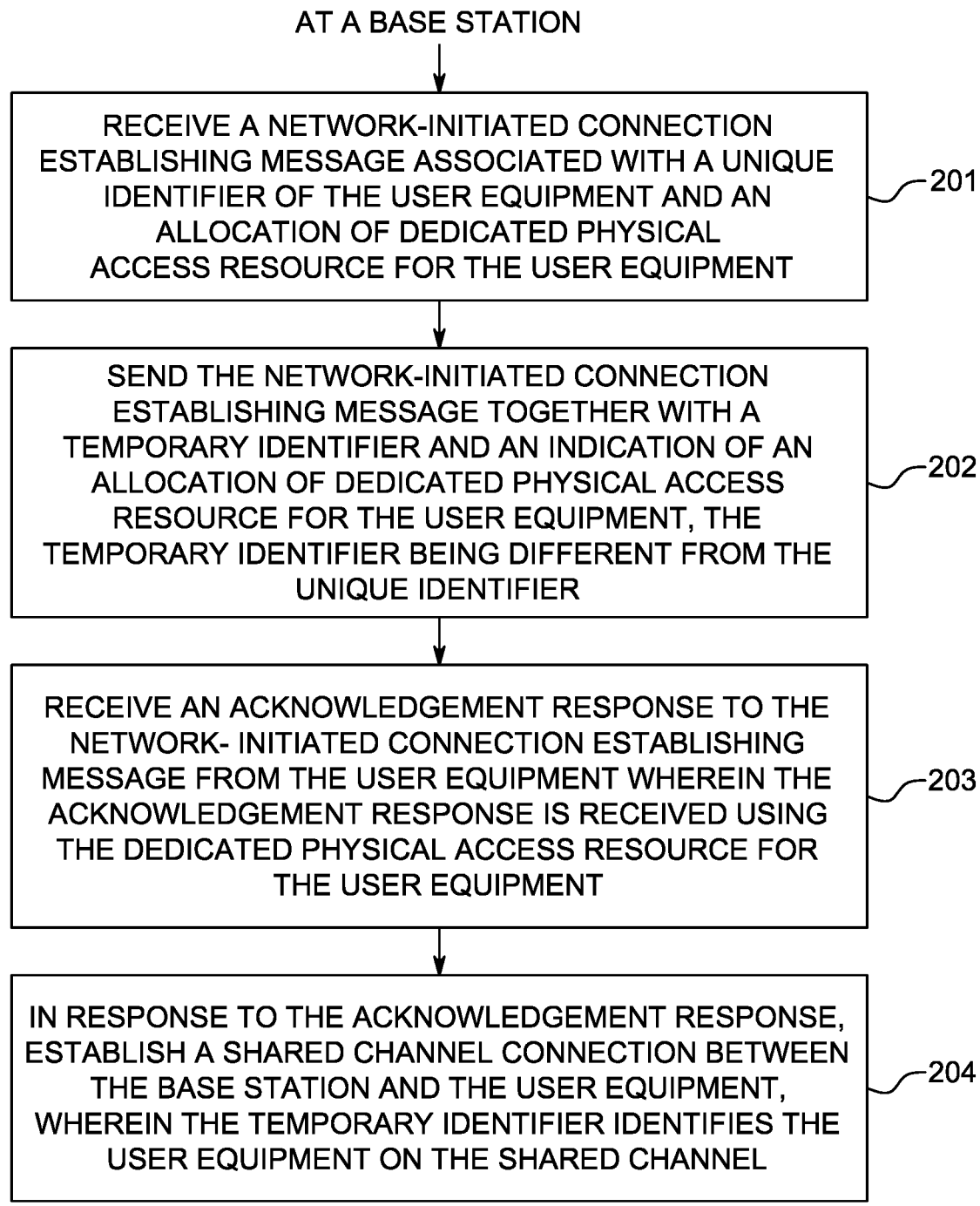
FIG. 14 illustrates a flow diagram according to embodiments of the invention.

In accordance with the foregoing teachings, and referring to FIG. 14, a base station can be configured to receive (201) a network-initiated connection establishing message associated with a unique identifier of the user equipment and an allocation of dedicated physical access resource for the user equipment, send (202) the network-initiated connection establishing message together with a temporary identifier and an indication of an allocation of dedicated physical access resource for the user equipment, the temporary identifier being different from the unique identifier, receive (203) an acknowledgement response to the network-initiated connection establishing message from the user equipment wherein the acknowledgement response is received using the dedicated physical access resource for the user equipment, and in response to the acknowledgement response, establish (204) a shared channel connection between the base station and the user equipment, wherein the temporary identifier identifies the user equipment on the shared channel.

Figure 15:
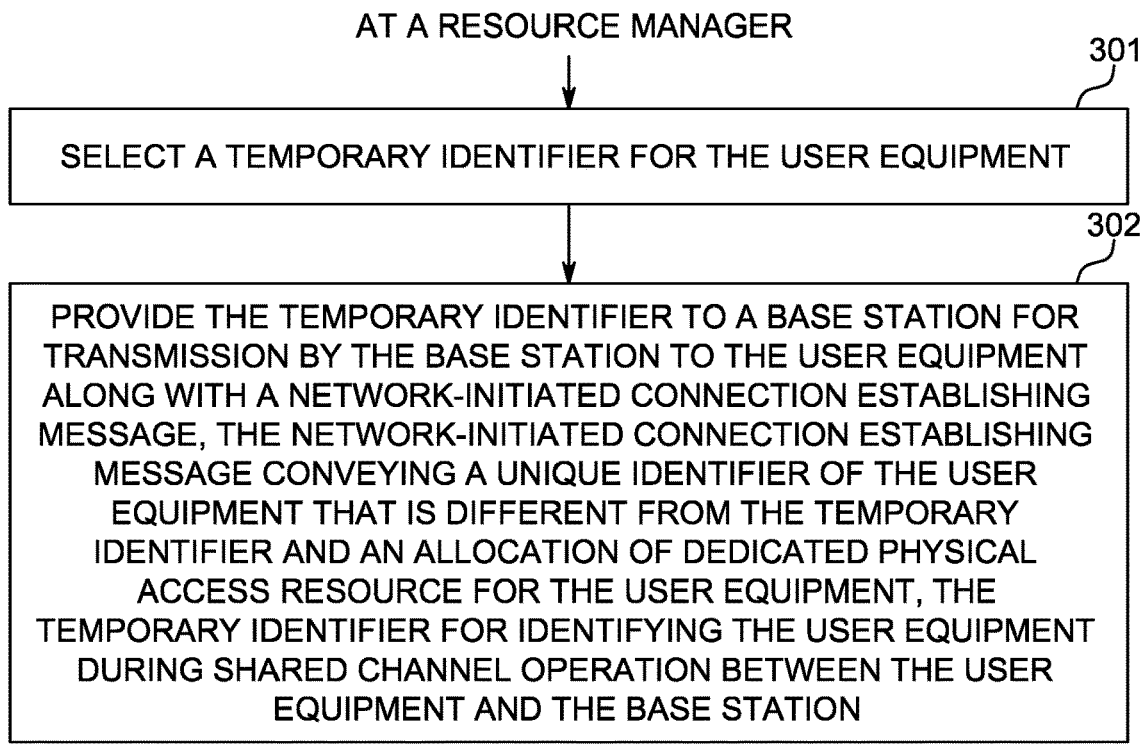
FIG. 15 illustrates a flow diagram according to embodiments of the invention.

Similarly, and referring to FIG. 15, a resource manager can be configured to select (301) a temporary identifier for the user equipment and then provide (302) the temporary identifier to a base station for transmission by the base station to the user equipment along with a network-initiated connection establishing message, the network-initiated connection establishing message conveying a unique identifier of the user equipment that is different from the temporary identifier and an allocation of dedicated physical access resource for the user equipment, the temporary identifier for identifying the user equipment during shared channel operation between the user equipment and the base station.

Figure 16:
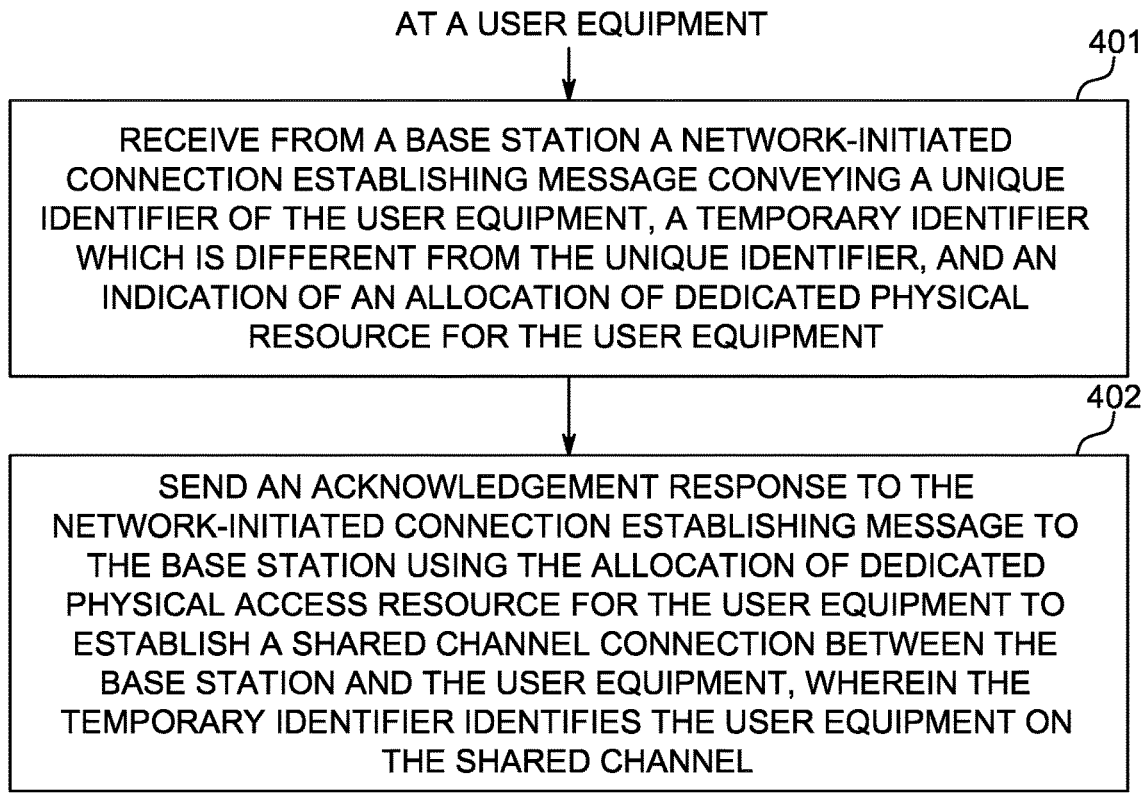
FIG. 16 illustrates a flow diagram according to embodiments of the invention.

And as a further illustrative example in these regards, and referring now to FIG. 16, a user equipment can be configured to receive (401) from a base station a network-initiated connection establishing message conveying a unique identifier of the user equipment, a temporary identifier which is different from the unique identifier, and an indication of an allocation of dedicated physical resource for the user equipment and then send (402) an acknowledgement response to the network-initiated connection establishing message to the base station using the allocation of dedicated physical access resource for the user equipment to establish a shared channel connection between the base station and the user equipment, wherein the temporary identifier identifies the user equipment on the shared channel.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to UMTS or 3G systems.

Those skilled in the art will recognize that the operations of the various embodiments may be implemented using hardware, software, firmware, or combinations thereof, as appropriate. For example, some processes can be carried out using digital circuitry or processors under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A network device comprising:
    a processor, electrically coupled to transmission circuitry, configured to:
    produce, in response to a paging message for a user equipment (UE), a first message that is derived from a paging identification and control information, wherein the control information includes an indication of shared channel resources, and produce a second message that is derived from the paging message;
    wherein the transmission circuitry is configured to transmit, to the UE, the first message on a control channel and the second message on a shared channel having the indicated shared channel resources.

2. The network device of claim 1, wherein the control channel selected to transmit the first message is selected out of a plurality of control channels that the network device is aware of the UE being preconfigured to monitor.

3. The network device of claim 1, wherein the control channel is transmitted in a time interval within a paging occasion of the UE, wherein the paging occasion of the UE is derived from an IMSI of the UE.

4. The network device of claim 1, wherein the shared channel is a contention-based channel.

5. The network device of claim 1, wherein the control channel is a broadcast channel.

6. The network device of claim 1, wherein the network device determines a paging occasion using a discontinuous reception (DRX) cycle of the UE.

7. A method performed by a network device, the method comprising:
    producing, by the network device in response to a paging message for a user equipment (UE), a first message that is derived from a paging identification and control information, wherein the control information includes an indication of shared channel resources, and producing, by the network device, a second message that is derived from the paging message; and
    transmitting, to the UE, by the network device, the first message on a control channel and the second message on a shared channel having the indicated shared channel resources.

8. The method of claim 7, wherein the control channel selected to transmit the first message is selected out of a plurality of control channels that the network device is aware of the UE being preconfigured to monitor.

9. The method of claim 7, wherein the control channel is transmitted in a time interval within a paging occasion of the UE, wherein the paging occasion of the UE is derived from an IMSI of the UE.

10. The method of claim 7, wherein the shared channel is a contention-based channel.

11. The method of claim 7, wherein the control channel is a broadcast channel.

12. The method of claim 7 further comprising determining, by the network device, a paging occasion using a discontinuous reception (DRX) cycle of the UE.

* * * * *